US011916333B2

(12) United States Patent
Kohen

(10) Patent No.: US 11,916,333 B2
(45) Date of Patent: Feb. 27, 2024

(54) QUICK CONNECT DEVICE WITH TRANSVERSE RELEASE

(71) Applicant: SKYX Platforms Corp., Johns Creek, GA (US)

(72) Inventor: Ran Roland Kohen, Aventura, FL (US)

(73) Assignee: SKYX Platforms Corp., Johns Creek, GA (US)

(*) Notice: Subject to any disclaimer, the term of this patent is extended or adjusted under 35 U.S.C. 154(b) by 0 days.

(21) Appl. No.: 17/432,155

(22) PCT Filed: Feb. 20, 2020

(86) PCT No.: PCT/US2020/019010
§ 371 (c)(1),
(2) Date: Aug. 19, 2021

(87) PCT Pub. No.: WO2020/172390
PCT Pub. Date: Aug. 27, 2020

(65) Prior Publication Data

US 2022/0190518 A1 Jun. 16, 2022

Related U.S. Application Data

(60) Provisional application No. 62/807,889, filed on Feb. 20, 2019.

(51) Int. Cl.
*H01R 13/62* (2006.01)
*H01R 13/627* (2006.01)
(Continued)

(52) U.S. Cl.
CPC ....... *H01R 13/6276* (2013.01); *H01R 13/635* (2013.01); *H01R 24/38* (2013.01)

(58) Field of Classification Search
None
See application file for complete search history.

(56) References Cited

U.S. PATENT DOCUMENTS 484,911 A 10/1892 Green
1,595,972 A 8/1926 DeReamer
(Continued)

FOREIGN PATENT DOCUMENTS

CA 2 549 756 A1 12/2007
CN 2586059 Y 11/2003
(Continued)

OTHER PUBLICATIONS http://wiki.dtonline.org/index.php/Linear_Cam, retrieved Jan. 3, 2023.*
(Continued)

*Primary Examiner* — Ross N Gushi
(74) *Attorney, Agent, or Firm* — Paul D. Bianco; Fleit Intellectual Property Law

(57) ABSTRACT

A known quick connect electrical connector has plug which has a spindle through which a rod is passed. Metal balls are contained within the spindle and can be pushed radially outwardly by a widened portion of the rod to lock the spindle to a passage in a corresponding socket. To separate the plug and socket, the rod must be pushed to move the widened portion away from the balls. To accomplish this, a cam follower is attached to the rod. Slide supports are attached to the plug. A lever slides within the slide supports and has a cam surface which pushes the cam follower when the lever is slid within the slide supports. When the cam follower is pushed, it moves the rod to enable the metal balls to move radially inwards to release the plug from the socket.

17 Claims, 16 Drawing Sheets

(51) Int. Cl.
*H01R 13/635* (2006.01)
*H01R 24/38* (2011.01)

(56) References Cited

U.S. PATENT DOCUMENTS

| | | | |
|---|---|---|---|
| 1,897,954 | A | 2/1933 | D'Olier |
| 2,077,587 | A | 4/1937 | Rowe |
| 2,308,016 | A | 1/1943 | Mihalyi |
| 2,313,481 | A | 3/1943 | Rendano |
| 2,494,428 | A | 1/1950 | Buck |
| 2,673,966 | A | 3/1954 | Larkin |
| 2,726,372 | A | 12/1955 | Appleton |
| 2,728,895 | A | 12/1955 | Quackenbush |
| 2,863,037 | A | 12/1958 | Johnstone |
| 3,056,035 | A | 9/1962 | Bernheim |
| 3,118,713 | A | 1/1964 | Ellis |
| 3,159,444 | A | 12/1964 | Stine |
| 3,193,636 | A | 7/1965 | Daniels |
| 3,386,071 | A | 5/1968 | Allen |
| 3,398,260 | A | 8/1968 | Martens |
| 3,521,216 | A | 7/1970 | Tolegian |
| 3,585,564 | A | 6/1971 | Skjervoll |
| 3,648,002 | A | 3/1972 | Du Rocher |
| 3,651,443 | A | 3/1972 | Quilez |
| 3,668,603 | A | 6/1972 | Burgess et al. |
| 3,798,584 | A | 3/1974 | Person |
| 3,808,577 | A | 4/1974 | Mathauser |
| 3,813,478 | A | 5/1974 | Ervin |
| 3,855,564 | A | 12/1974 | Dumas |
| 3,871,732 | A | 3/1975 | Appleton |
| 4,059,327 | A | 11/1977 | Vann |
| 4,079,244 | A | 3/1978 | Bortoluzzi |
| 4,083,619 | A | 4/1978 | McCormick et al. |
| 4,107,770 | A | 8/1978 | Weber |
| 4,133,594 | A | 1/1979 | Laverick et al. |
| 4,335,927 | A | 6/1982 | Allen et al. |
| 4,448,388 | A | 5/1984 | Dennis |
| 4,462,653 | A | 7/1984 | Flederbach |
| 4,473,869 | A | 9/1984 | De Widt |
| 4,588,248 | A | 5/1986 | Moore |
| 4,629,843 | A | 12/1986 | Kato et al. |
| 4,631,648 | A | 12/1986 | Nilssen |
| 4,681,385 | A | 7/1987 | Kruger et al. |
| 4,753,600 | A | 6/1988 | Williams |
| 5,003,128 | A | 3/1991 | Grondin |
| 5,034,869 | A | 7/1991 | Choi |
| 5,173,053 | A | 12/1992 | Swanson et al. |
| 5,250,874 | A | 10/1993 | Hall et al. |
| 5,352,122 | A | 10/1994 | Speyer |
| 5,362,122 | A | 11/1994 | Reihl et al. |
| 5,438,216 | A | 8/1995 | Juskey et al. |
| 5,442,532 | A | 8/1995 | Boulos |
| 5,442,632 | A | 8/1995 | Boulos et al. |
| 5,494,325 | A | 2/1996 | Liu et al. |
| 5,494,326 | A | 2/1996 | Hinds |
| 5,536,685 | A | 7/1996 | Burward-Hoy |
| 5,551,882 | A | 9/1996 | Whiteman |
| 5,562,458 | A | 10/1996 | Stora et al. |
| 5,584,726 | A | 12/1996 | Le Gallic |
| 5,600,537 | A | 2/1997 | Gordin |
| 5,622,873 | A | 4/1997 | Kim et al. |
| 5,668,920 | A | 9/1997 | Pelonis |
| 5,710,541 | A | 1/1998 | Stanley |
| 5,754,408 | A | 5/1998 | Derouiche |
| 5,777,391 | A | 7/1998 | Nakamura et al. |
| 5,790,381 | A | 8/1998 | Derouiche et al. |
| 5,803,590 | A | 9/1998 | Wedell et al. |
| 5,808,556 | A | 9/1998 | Nelson |
| 5,836,781 | A | 11/1998 | Hyzin |
| 5,952,714 | A | 9/1999 | Sano et al. |
| 5,962,810 | A | 10/1999 | Glenn |
| 6,064,155 | A | 5/2000 | Maya |
| 6,068,490 | A | 5/2000 | Salzberg |
| 6,093,029 | A | 7/2000 | Kwon et al. |
| 6,129,598 | A | 10/2000 | Yu et al. |
| 6,135,800 | A | 10/2000 | Majors |
| 6,170,967 | B1 | 1/2001 | Usher et al. |
| 6,175,159 | B1 | 1/2001 | Sasaki |
| 6,240,247 | B1 | 5/2001 | Reiker |
| 6,241,559 | B1 | 6/2001 | Taylor |
| 6,332,794 | B1 | 12/2001 | Tzeng Jeng |
| 6,340,790 | B1 | 1/2002 | Gordin et al. |
| 6,364,716 | B1 | 4/2002 | Seo |
| 6,366,733 | B1 | 4/2002 | Reiker |
| 6,398,392 | B2 | 6/2002 | Gordin et al. |
| 6,422,722 | B1 | 7/2002 | Voltolina |
| 6,517,223 | B2 | 2/2003 | Hsu |
| 6,595,782 | B1 | 7/2003 | Hsiao |
| 6,598,990 | B2 | 7/2003 | Li |
| 6,631,243 | B2 | 10/2003 | Reiker |
| 6,648,488 | B1 | 11/2003 | Pearce |
| 6,751,406 | B2 | 6/2004 | Reiker |
| 6,793,383 | B2 | 9/2004 | Wu |
| 6,821,089 | B2 | 11/2004 | Bilskie |
| 6,837,754 | B1 | 1/2005 | Walton |
| 6,930,250 | B1 | 8/2005 | Drane |
| 6,962,498 | B2 | 11/2005 | Kohen |
| 7,001,199 | B1 | 2/2006 | Badalpour |
| 7,052,301 | B2 | 5/2006 | Garcia et al. |
| 7,066,739 | B2 | 6/2006 | McLeish |
| 7,192,303 | B2 | 3/2007 | Kohen |
| 7,462,066 | B2 * | 12/2008 | Kohen .............. H01R 13/6276 439/537 |
| 7,467,881 | B2 | 12/2008 | McMillen |
| 7,569,710 | B1 | 8/2009 | Ozero |
| 7,706,757 | B2 | 4/2010 | Luglio et al. |
| 7,723,862 | B1 | 5/2010 | Spillman et al. |
| 7,878,691 | B2 | 2/2011 | Liang |
| 7,891,841 | B2 | 2/2011 | Levine |
| 8,123,378 | B1 | 2/2012 | Ruberg et al. |
| 8,186,852 | B2 | 5/2012 | Dassanayake et al. |
| 8,192,057 | B2 | 6/2012 | Dassanayake et al. |
| 8,235,549 | B2 | 8/2012 | Tyco |
| 8,277,082 | B2 | 10/2012 | Dassanayake et al. |
| 8,348,678 | B2 | 1/2013 | Hardisty |
| 8,354,768 | B2 | 1/2013 | Cipriani |
| 8,357,016 | B2 | 1/2013 | Schumacher |
| 8,419,218 | B2 | 4/2013 | Dassanayake et al. |
| 8,449,137 | B2 | 5/2013 | Dassanayake et al. |
| 8,558,413 | B1 | 10/2013 | Lepard |
| D693,765 | S | 11/2013 | Workman |
| 8,702,435 | B2 | 4/2014 | Tajima |
| 8,854,796 | B2 | 10/2014 | Wilcox |
| 8,888,326 | B2 | 11/2014 | Hatch |
| 8,894,247 | B2 | 11/2014 | Kim et al. |
| 8,979,347 | B2 | 3/2015 | Holman |
| 9,328,910 | B2 | 5/2016 | Lin et al. |
| 9,500,352 | B2 | 11/2016 | Van Winkle |
| 9,644,824 | B2 | 5/2017 | Dassanayake et al. |
| 9,702,535 | B2 | 7/2017 | Dassanayake et al. |
| 9,901,039 | B1 | 2/2018 | Dellerson et al. |
| 9,903,576 | B2 | 2/2018 | Creasman et al. |
| 10,208,977 | B2 | 2/2019 | Bhide |
| 10,266,998 | B2 * | 4/2019 | Apostolopoulos ...... F16B 5/008 |
| 10,317,015 | B2 | 6/2019 | Joye |
| 10,326,247 | B2 | 6/2019 | Kohen |
| 10,326,274 | B2 | 6/2019 | Kempen |
| 10,845,046 | B2 | 11/2020 | Kohen |
| 11,196,216 | B2 | 12/2021 | Kohen |
| 11,460,184 | B2 | 10/2022 | Kohen |
| 2002/0060369 | A1 | 5/2002 | Akram |
| 2002/0064380 | A1 | 5/2002 | Reiker |
| 2002/0081107 | A1 | 6/2002 | Reiker |
| 2003/0012027 | A1 | 1/2003 | Hsu |
| 2003/0107891 | A1 | 6/2003 | Kohen |
| 2004/0192415 | A1 | 9/2004 | Luglio et al. |
| 2004/0223331 | A1 | 11/2004 | Kao |
| 2005/0148241 | A1 | 7/2005 | Kohen |
| 2006/0044789 | A1 | 3/2006 | Curtis |
| 2006/0141842 | A1 | 6/2006 | Sauer |
| 2006/0146527 | A1 | 7/2006 | Vanderschuit |
| 2007/0105414 | A1 | 5/2007 | Kohen |
| 2007/0167072 | A1 | 7/2007 | Kohen |
| 2007/0258202 | A1 | 11/2007 | Cooley et al. |

(56) References Cited

U.S. PATENT DOCUMENTS

| | | | |
|---|---|---|---|
| 2008/0146064 | A1 | 6/2008 | Bankstahl |
| 2008/0225531 | A1 | 9/2008 | Shiller |
| 2009/0035970 | A1 | 2/2009 | Kohen |
| 2009/0111322 | A1 | 4/2009 | Roland |
| 2009/0129974 | A1 | 5/2009 | McEllen |
| 2009/0280673 | A1 | 11/2009 | Kohen |
| 2010/0020550 | A1 | 1/2010 | Kawashima |
| 2010/0214775 | A1 | 8/2010 | Liang |
| 2010/0295473 | A1 | 11/2010 | Chernel |
| 2010/0301769 | A1 | 12/2010 | Chemel et al. |
| 2011/0060701 | A1 | 3/2011 | Verfuerth et al. |
| 2011/0134239 | A1 | 6/2011 | Vadai et al. |
| 2012/0196471 | A1 | 8/2012 | Guo |
| 2013/0040471 | A1 | 2/2013 | Gervais et al. |
| 2013/0107536 | A1 | 5/2013 | Hiraoka |
| 2014/0168944 | A1 | 6/2014 | Osada et al. |
| 2014/0211487 | A1 | 7/2014 | Spiro |
| 2014/0225731 | A1 | 8/2014 | Gouveia |
| 2014/0263903 | A1 | 9/2014 | Ostrobrod |
| 2014/0268790 | A1 | 9/2014 | Chobot et al. |
| 2014/0301071 | A1 | 10/2014 | Jørgensen |
| 2015/0009666 | A1 | 1/2015 | Keng et al. |
| 2015/0009676 | A1 | 1/2015 | Danesh |
| 2015/0044040 | A1 | 2/2015 | Oda et al. |
| 2015/0085500 | A1 | 3/2015 | Cooper |
| 2016/0053952 | A1 | 2/2016 | Kuti et al. |
| 2016/0069556 | A1 | 3/2016 | Li |
| 2016/0074574 | A1 | 3/2016 | Welsch |
| 2016/0123374 | A1 | 5/2016 | Roberts |
| 2016/0131358 | A1 | 5/2016 | Spiro |
| 2016/0255697 | A1 | 9/2016 | Bhide |
| 2017/0105265 | A1 | 4/2017 | Sadwick |
| 2017/0234319 | A1 | 8/2017 | Seccareccia |
| 2017/0248148 | A1 | 8/2017 | Kohen |
| 2018/0115131 | A1 | 4/2018 | Kohen |
| 2018/0169279 | A1 | 6/2018 | Randers-Pehrson et al. |
| 2019/0224350 | A1 | 7/2019 | Marry et al. |
| 2019/0312396 | A1 | 10/2019 | Kohen |
| 2020/0018469 | A1 | 1/2020 | Kohen |
| 2020/0056773 | A1 | 2/2020 | Kohen |
| 2020/0144766 | A1 | 5/2020 | Kohen |
| 2021/0296819 | A1 | 9/2021 | Kohen |

FOREIGN PATENT DOCUMENTS

| | | | |
|---|---|---|---|
| CN | 1582518 | A | 2/2005 |
| CN | 1728475 | A | 2/2006 |
| CN | ZL 01 8 23877.7 | | 11/2007 |
| CN | 10195268 | A | 12/2007 |
| CN | 101095268 | A | 12/2007 |
| CN | 102483213 | A | 5/2012 |
| CN | 202501418 | U | 10/2012 |
| CN | 102870307 | A | 1/2013 |
| CN | 104033399 | A | 9/2014 |
| CN | 203934061 | U | 11/2014 |
| CN | 204879746 | U | 12/2015 |
| CN | 105674223 | A | 6/2016 |
| CN | 107211515 | A | 9/2017 |
| DE | 19849101 | A1 | 4/1999 |
| DE | 29923352 | U1 | 8/2000 |
| DE | 20203467 | U1 | 6/2002 |
| EP | 0704934 | A2 | 4/1996 |
| EP | 1024559 | A2 | 8/2000 |
| EP | 1456914 | A1 | 9/2004 |
| EP | 1789984 | A2 | 5/2007 |
| EP | 3295525 | A1 | 5/2016 |
| IL | 126246 | | 8/2001 |
| JP | 2003-16831 | A | 1/2003 |
| JP | 2003-016831 | A | 1/2003 |
| JP | 2004-320228 | A | 11/2004 |
| JP | 2008166071 | A | 7/2008 |
| JP | 2010129489 | A | 6/2010 |
| JP | 5331043 | B2 | 10/2013 |
| JP | 53311043 | B2 | 10/2013 |
| RU | 2011122686 | | 10/2012 |
| RU | 2526853 | | 8/2014 |
| WO | 00/16442 | | 3/2000 |
| WO | 01/01047 | A1 | 1/2001 |
| WO | 03/044906 | A1 | 5/2003 |
| WO | 2005/053100 | A2 | 6/2005 |
| WO | 2005053100 | A2 | 6/2005 |
| WO | 2005/074087 | A1 | 8/2005 |
| WO | 2006031853 | A2 | 3/2006 |
| WO | 2006/060772 | A2 | 6/2006 |
| WO | 2006060772 | A2 | 6/2006 |
| WO | 2010/064914 | A1 | 6/2010 |
| WO | 2011/005526 | A2 | 1/2011 |
| WO | 2011/020231 | A1 | 2/2011 |
| WO | 2011/134709 | A2 | 3/2011 |
| WO | 2011/134709 | A2 | 11/2011 |
| WO | 2013/159833 | A1 | 10/2012 |
| WO | 2012/167320 | A1 | 12/2012 |
| WO | 2016/009181 | A1 | 1/2016 |
| WO | 2016054159 | A1 | 4/2016 |
| WO | 2016/144795 | A1 | 9/2016 |
| WO | 2016/183354 | | 11/2016 |
| WO | 2016/183354 | A1 | 11/2016 |
| WO | 2016183354 | A1 | 11/2016 |
| WO | 2018/165646 | | 9/2018 |
| WO | 2018/165058 | | 10/2018 |
| WO | 2018/195068 | | 10/2018 |
| WO | 2018/195068 | A1 | 10/2018 |
| WO | 2019/222259 | A1 | 11/2019 |
| WO | 2020/039215 | | 2/2020 |
| WO | 2020/039215 | A1 | 2/2020 |
| WO | 2020/172390 | A1 | 8/2020 |
| WO | 2021/226018 | A1 | 11/2021 |
| WO | 2022/150645 | A1 | 7/2022 |
| WO | 2022/159853 | A1 | 7/2022 |

OTHER PUBLICATIONS

International Search Report dated May 25, 2020 for PCT/US2020/019010 filed Feb. 20, 2020.

Written Opinion dated May 25, 2020 for PCT/US2020/019010 filed Feb. 20, 2020.

International Search Report, Written Opinion, International Preliminary Report on Patentability for PCT/US2004/039399 filed Nov. 22, 2004.

International Search Report, Written Opinion, International Preliminary Report on Patentability for PCT/US2005/032661 filed Sep. 14, 2005.

International Search Report, Written Opinion, International Preliminary Report on Patentability for PCT/US2005/043934 filed Dec. 2, 2005.

International Search Report, Written Opinion, International Preliminary Report on Patentability for PCT/US2015/53138 filed Sep. 30, 2015.

International Search Report and Written Opinion for PCT/US2016/32170 filed May 12, 2016.

European Search Report for EP05796234 dated Nov. 5, 2007 (related to WO2006/031853).

International Search Report for PCT/IL01/01078 filed Nov. 22, 2001.

Notification of Reasons for Refusal, Office Action dated Jan. 4, 2022, for Japanese Patent Appl. No. 2019-548872 (18 pages with English translation).

International Search Report with Written Opinion dated Aug. 13, 2018 for PCT/US2018/030372.

Office Action dated Sep. 25, 2018 from Chinese Patent Office for Application No. 201580063483.2.

For U.S. Appl. No. 15/515,664, filed Mar. 30, 2017: Responses filed Jan. 10, 2020, Sep. 10, 2020, Jul. 27, 2021 Notice of Allowance dated Aug. 23, 2021.

Office Action dated Nov. 4, 2022 for European Patent Application No. 16 793 548.5.

International Preliminary Report on Patentability, dated Aug. 30, 2022, for PCT/US2021/020233.

Response to Office Action filed Nov. 3, 2022 for Indian Patent Application No. 201937046706.

(56) References Cited

OTHER PUBLICATIONS

Office Action dated Jan. 26, 2022, for European Patent Application No. 18 763 646.9 (National Stage of PCT/US2018/020987) (6 pages).
International Search Report dated Jul. 18, 2016 for International Application No. PCT/US2016/032170, filed May 12, 2016.
Written Opinion for International Application No. PCT/US2016/032170, filed May 12, 2016.
Notice of Allowance dated Nov. 4, 2021 for Japanese Patent Application No. 2018-511347 (with English translation).
Notification of Publication dated Nov. 11, 2021 for Chinese Application No. 202080022559.8 (with English translation).
First Office Action dated Nov. 3, 2021 for Canadian Patent Application No. 2,963,134.
Office Action for U.S. Appl. No. 15/515,664, dated Sep. 10, 2019.
International Preliminary Report on Patentability dated Sep. 10, 2019 for PCT/US2018/020987, filed Mar. 5, 2018.
International Search Report dated Jul. 6, 2018 for PCT/US2018/027956 filed Apr. 17, 2018.
Written Opinion dated Jul. 6, 2018 for PCT/US2018/027956 filed Apr. 17, 2018.
International Search Report dated May 17, 2018 for PCT/US2018/021919 filed Mar. 12, 2018.
Witten Opinion for PCT/US2018/021919 filed Mar. 12, 2018.
International Preliminary Report on Patentability dated Sep. 10, 2019 for PCT/US2018/021919.
International Search Report dated Aug. 13, 2018 for PCT/US2018/030372 filed May 1, 2018.
Written Opinion dated Aug. 13, 2018 for PCT/US2018/030372 filed May 1, 2018.
International Preliminary Report on Patentability dated Oct. 22, 2019 for PCT/US2018/027956.
First Office Action dated Sep. 2, 2020 for Chinese Application No. 201880030051.5 with translation of cover page (12 pages).
Response to First Examination Report, filed Sep. 4, 2020 for Indian Patent Application No. 201717013438, National Stage of PCT/US2015/053138.
Office Action dated Aug. 3, 2020, for European Patent Application No. 16793548.5 (Regional Stage of PCT/US2016/032170).
International Search Report and Written Opinion dated Apr. 8, 2022 for PCT/US2022/013598 filed Jan. 25, 2022.
Office Action for U.S. Appl. No. 16/491,321, dated Apr. 21, 2020.
Office Action dated Sep. 1, 2022 for Canadian Application No. 2,985,821.
International Search Report and Written Opinion for PCT/US2018/21919 filed Mar. 12, 2018.
International Search Report and Written Opinion for PCT/US2018/20987 filed Mar. 5, 2018.
European Search Report dated Jul. 3, 2018 for Application No. 15846948.6.
For Mexican Patent Application No. MX/A/2017/014475 (national Stage of PCT/US2016/032170): Office Action dated Feb. 3, 2021, with English translation.
First Examination Report dated Mar. 25, 2021 for Indian Patent Application No. 201937040845.
Chinese Patent Application No. 2018800402400 (National Stage of PCT/US2018/030372): Second Office Action, dated Jun. 1, 2021.
Notification of Reasons for Refusal, Office Action dated Jan. 4, 2022, for Japanese Patent Appl. 2019-548272 (8 pages with English translation).
English translation of Search Report from Chinese Patent Office for Application No. 201580063483.2 dated Sep. 11, 2018.
Office Action from Chinese Patent Office for Application No. 201580063483.2 dated Sep. 25, 2018 (with English translation).
First Notification of Office Action dated Nov. 19, 2020, for Chinese Application No. 2018800333913, National Stage of PCT/US2018/02795610 pages (with partial English translation).
First Office Action dated Dec. 23, 2020, for Israeli Patent Application No. 255549, National Stage of PCT/US2016/32170 7 pages.
Office Action dated Jan. 27, 2021, for U.S. Appl. No. 15/515,664, filed Mar. 30, 2017 67 pages.
IAEI, When continuity snaps, May-Jun. 2015.
IAEI, Supports reinforce our safety, Hanging Support Systems, Mar.-Apr. 2015.
For U.S. Appl. No. 16/605,994: Notice of Allowance dated Jun. 29, 2020.
First Examination Report dated Jun. 2, 2020 for Indian Patent No. 201717042509 filed Nov. 27, 2017.
Office Action dated Oct. 28, 2022 for European Patent Application No. 18 764 255.8.
International Search Report dated Aug. 4, 2021 for PCT/US2021/030568, filed May 4, 2021.
Written Opinion dated Aug. 4, 2021 for PCT/US2021/030568, filed May 4, 2021.
For Russian Patent Application 2017142137 (national Stage of PCT/US2016/032170): Prosecution history including decision to grant dated Oct. 25, 2019.
Office Action issued by the European Patent Office dated Dec. 19, 2019 for Application No. 16 793 548.5-1201.
Response filed Jan. 17, 2019, in U.S. Appl. No. 15/573,606.
European Search Report for Application No. 16793548.5 dated Feb. 14, 2019.
Publication issued in the Official Gazette from Mexican Patent Application MX/a/2017/004137 dated Feb. 13, 2018, 3 pages.
Notice of Allowance dated Feb. 2, 2021 for U.S. Appl. No. 16/443,207.
Office Action dated Jan. 28, 2022 for U.S. Appl. No. 17/240,102, filed Apr. 26, 2021.
Office Action dated Dec. 13, 2021 issued by the European Patent Office for Application No. 15 846 948.6.
Response to Office Action, dated Jan. 12, 2022, for Mexican Patent Appl. No. MX/A/2017/004137.
International Preliminary Report on Patentability dated Aug. 10, 2021 (with Written Opinion) for PCT/US2020/019010.
Final Office Action for U.S. Appl. No. 15/515,664, dated Mar. 10, 2020.
Office Action for U.S. Appl. No. 16/443,207, dated Mar. 11, 2020.
First Examination Report (FER) dated Feb. 13, 2022, and Response, dated Aug. 18, 2022, for Indian Application No. 201937049201 (17 pages).
Communication dated Nov. 17, 2020 for European Patent Application No. 187636469.
Supplemental European Search Report dated Oct. 30, 2020 for European Patent Application No. 187636469.
Extended Search Report dated Oct. 17, 2022 for Application No. 20768521.7.
International Preliminary Report on Patentability dated Nov. 14, 2017 for International Application No. PCT/US2016/032170 filed May 12, 2016.
International Preliminary Report on Patentability dated Sep. 10, 2019 with Written Opinion for PCT/US2018/021919, filed Mar. 12, 2018.
Second Office Action for Chinese Patent Application No. 201580063483.2, dated Jun. 14, 2019 (with translation of cover page).
Amendment and Statement of Argument filed with the Japanese Patent Office dated Aug. 6, 2021 for Japanese Patent Application No. 2018-511347.
International Search Report for PCT/IL99/00499 filed Sep. 14, 1999.
European Search Report for EP 01 27 4757 dated Mar. 28, 2006.
Australian Examiner's First Report on Patent Application AU 2002221000.
Indian First Examination Report dated Jun. 24, 2010 for Indian Application No. 1677/KOLNP/2006.
New Zealand Examination Report for NZ Patent Application No. 533697 dated May 9, 2007.
For Chinese Patent Application No. 01823877.7: Notice of Allowance dated Oct. 17, 2006 Second Office Action dated Apr. 6, 2007 First Office Action dated Jul. 4, 2006.
International Search Report and Written Opinion dated Mar. 23, 2022 for PCT/US2022/011701 filed Jan. 7, 2022.

(56) References Cited

OTHER PUBLICATIONS

Notice of Allowance dated May 31, 2022 for U.S. Appl. No. 17/240,102.
Decision of Refusal (Office Action) dated Sep. 13, 2022 for Japanese Patent Application No. 2019-548272.
International Preliminary Report on Patentability dated Nov. 5, 2019 for International Application No. PCT/US2018/030372 filed May 1, 2018, 6 pages.
Written Opinion for International Application No. PCT/US2018/030372 filed May 1, 2018, 5 pages.
For Chinese Patent Application No. 201580063483.2 (national stage of PCT/US2015/053138): Third Office Action, dated Sep. 18, 2019 (with English translation) Response to Third Office Action, dated Dec. 2, 2019 (13 pages).
For Chinese Patent Application No. 201580063483.2 (national stage of PCT/US2015/053138): Response to First Office Action, dated Feb. 11, 2019 (9 pages) Response to Second Office Action, dated Aug. 26, 2019 (12 pages).
For Chinese Patent Application No. 2016800404661 (national stage of PCT/US2016/032170): Second Office Action, dated Dec. 2, 2019 (3 pages) Search Report, dated Nov. 24, 2019 (2 pages).
For Indian Patent Application No. 201717013438 (National Stage of PCT/US2015/053138): First Examination Report, dated Dec. 13, 2019 (6 pages).
Notice of Allowance dated Jul. 8, 2020 for U.S. Appl. No. 16/609,875.
First Office Action dated Aug. 13, 2020 for Chinese Application No. 2018800295358.
Search Report dated Aug. 7, 2020 for Chinese Application No. 2018800295358.
First Office Action dated Oct. 23, 2020 for Chinese Application No. 2018800402400.
Notification of Transmittal of International Search Report and the Written Opinion of the International Searching Authority, or the Declaration for PCT/US2021/020233 filed Mar. 1, 2021.
European Search Report dated Oct. 21, 2020 for EP 18764255.8.
For Brazilian Patent Application No. BR 11 2017 024224-9 (National Stage of PCT/US2016/032170): Response filed Oct. 14, 2020.
International Search Report with Written Opinion dated Jul. 6, 2018 for PCT/US2018/027956.
Office Action dated Sep. 18, 2018 in U.S. Appl. No. 15/573,606.
International Preliminary Report on Patentability and Written Opinion dated Nov. 8, 2022 for PCT/US2021/030568, filed May 4, 2021 (English translation).
Chinese Search Report dated Feb. 18, 2019 for Patent Application No. 2016800404661.
First Office Action dated Feb. 27, 2019 from Chinese Patent Office for Patent Application No. 201680040466.1.
First Examination Report for Mexican Patent Application No. MX/a/2017/004137, dated Aug. 10, 2021 (English translation).
International Search Report and Written Opinion for PCT/US2021/030568, filed May 4, 2021.
For Russian Application No. 2021127449 filed Feb. 20, 2020: Russian Office Action dated May 16, 2023 Russian Search Report dated May 11, 2023.
Office Action dated Mar. 27, 2023 for Korean Patent Application No. 10-2017-7035630.
Japanese Notice of Allowance dated Mar. 16, 2023 for Japanese Patent Application No. 2019-548272.

* cited by examiner

FIG. 5
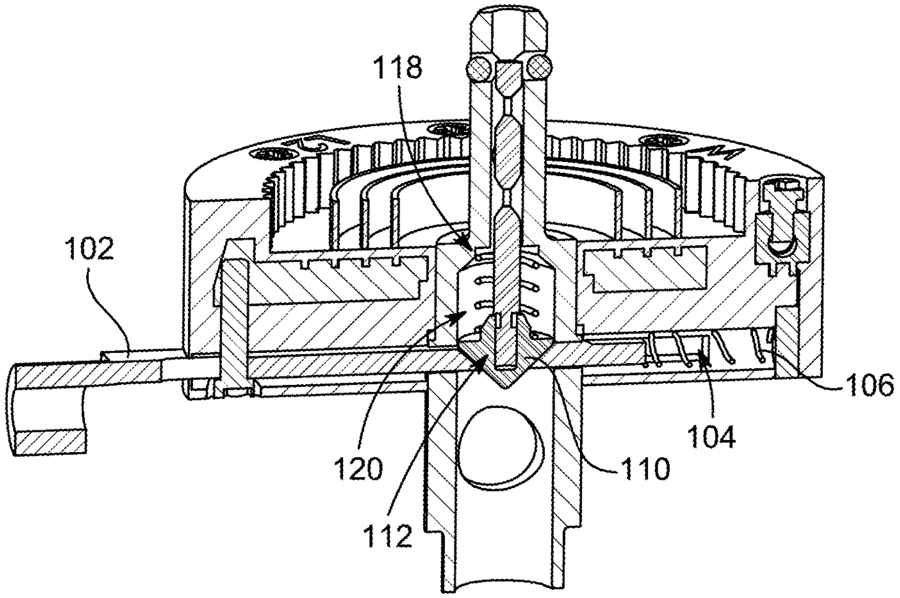
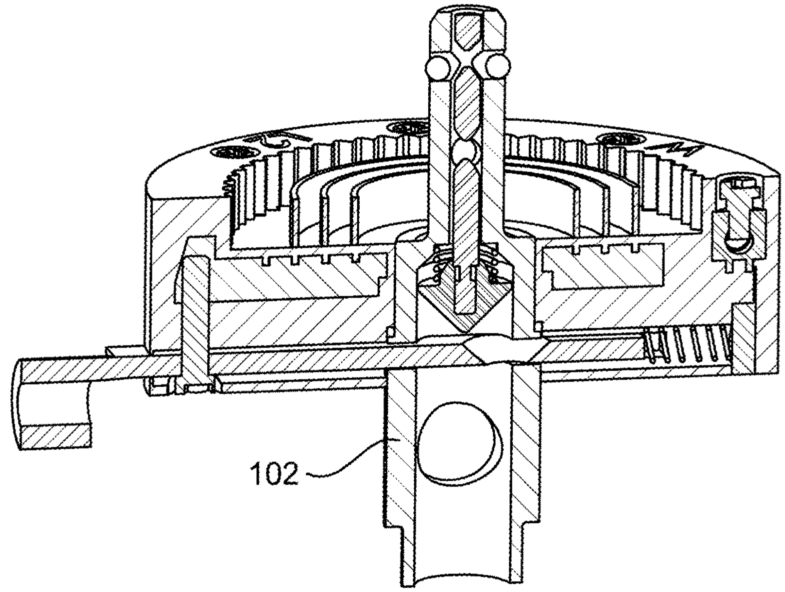
FIG. 6
FIG. 7
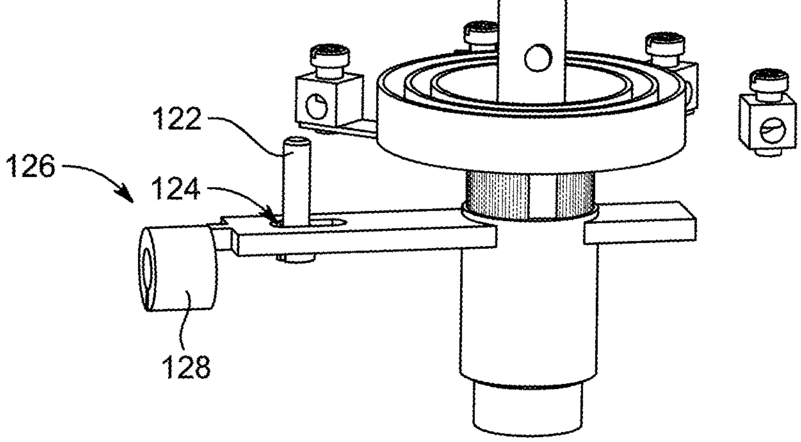

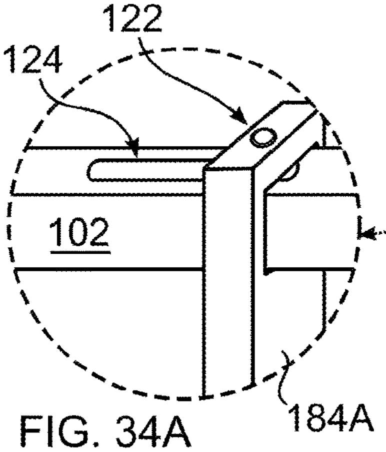
FIG. 34A
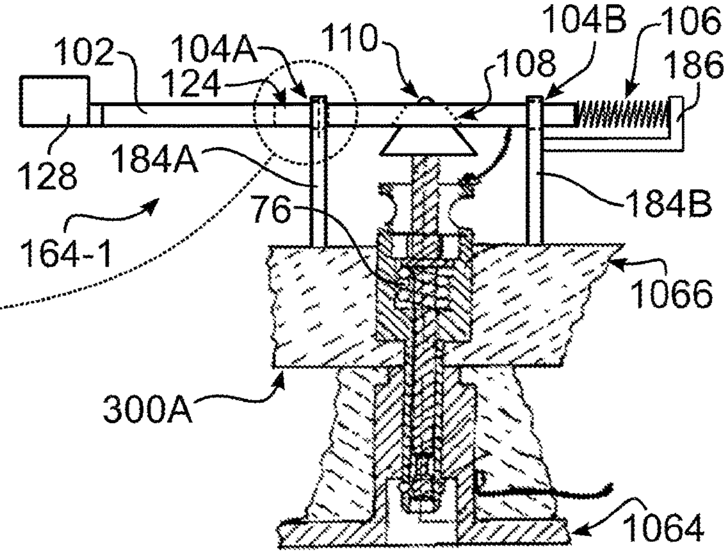
FIG. 34
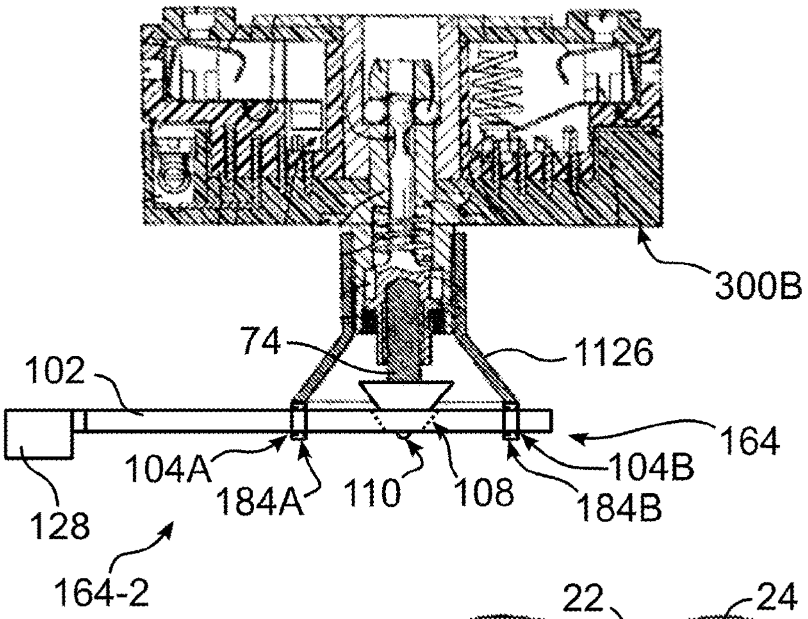
FIG. 35
FIG. 36
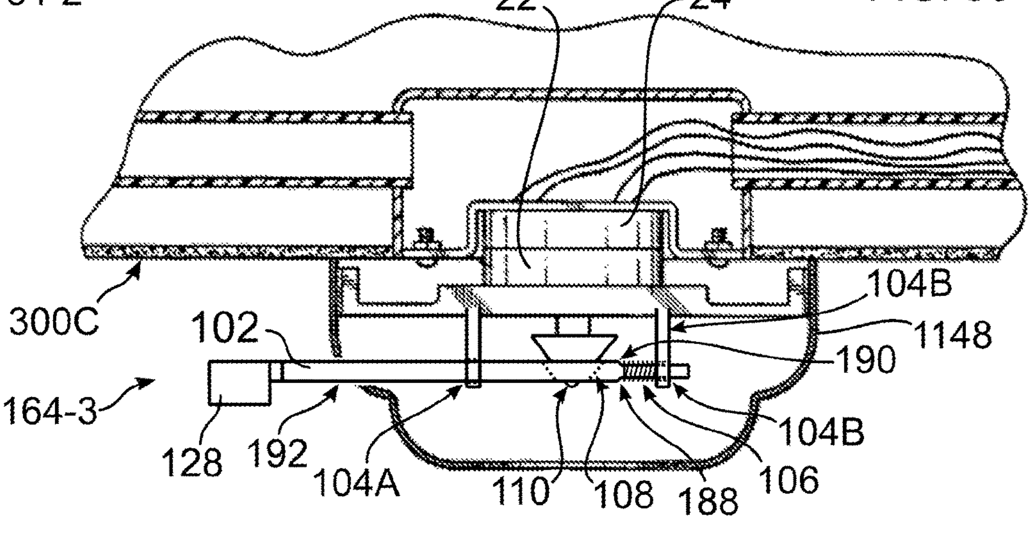

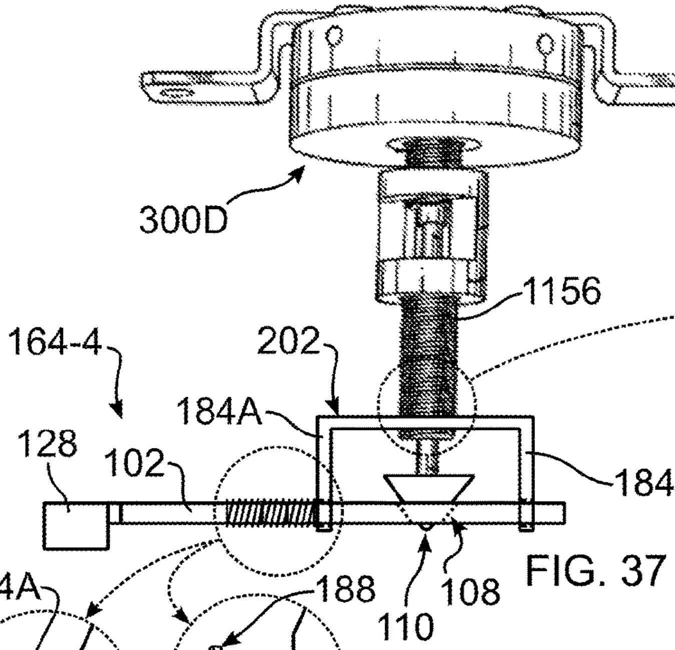
FIG. 37
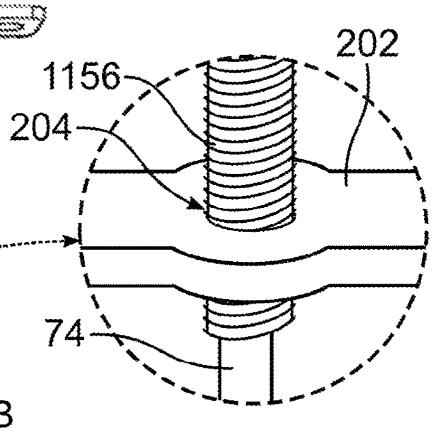
FIG. 37A
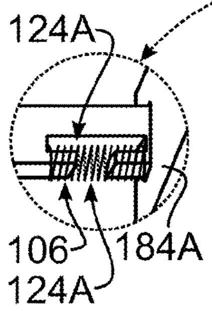
FIG. 37B
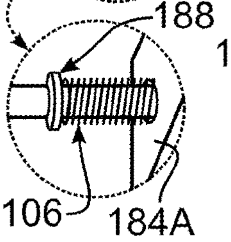
FIG. 37C
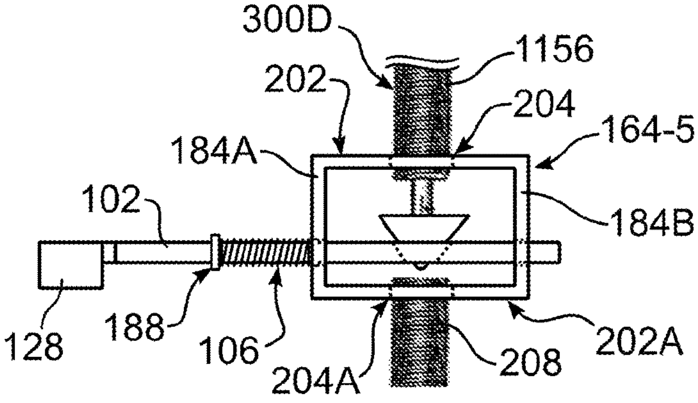
FIG. 38
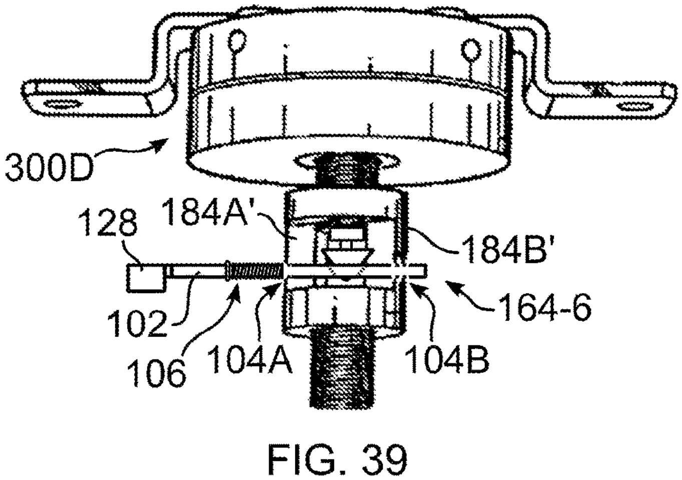
FIG. 39
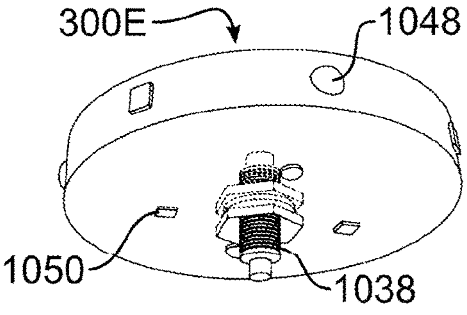
FIG. 40 - PRIOR ART

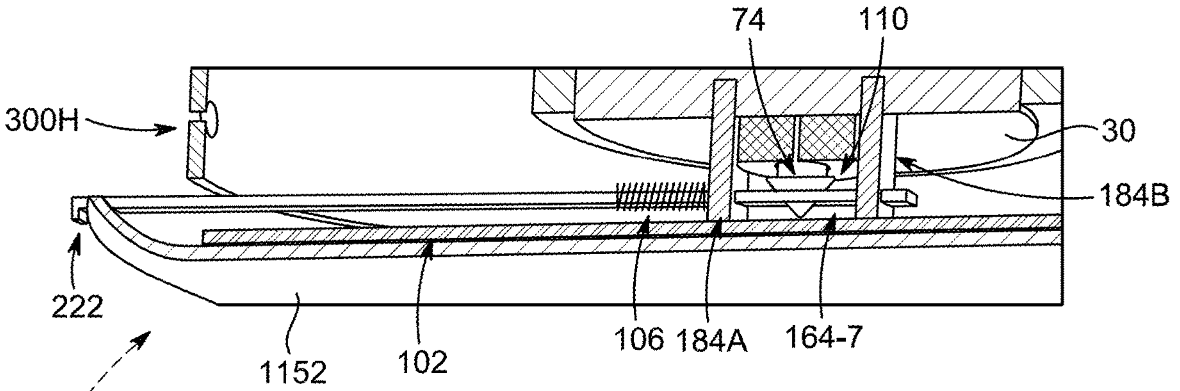
FIG. 44A
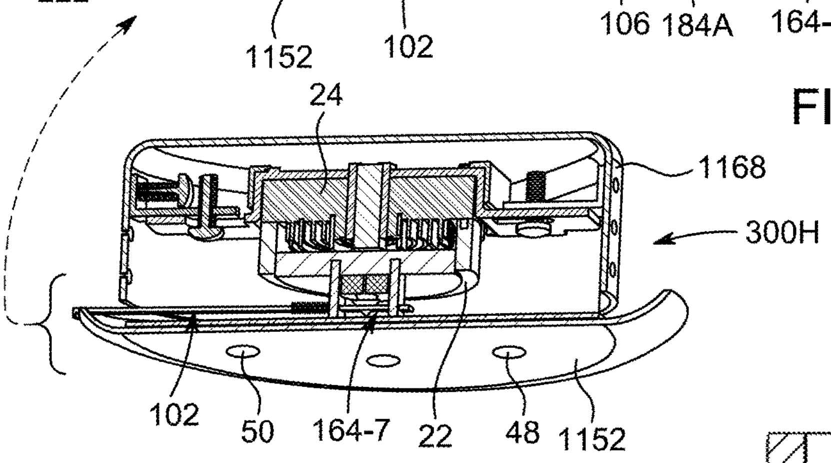
FIG. 44
FIG. 45
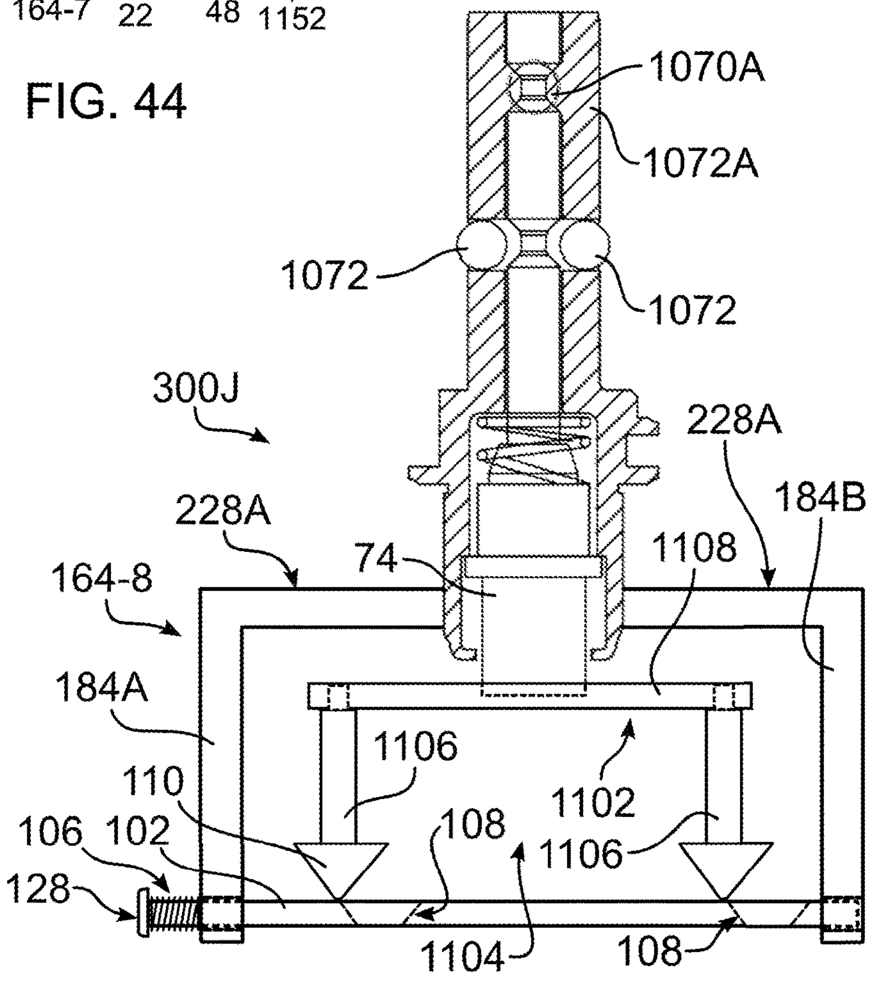

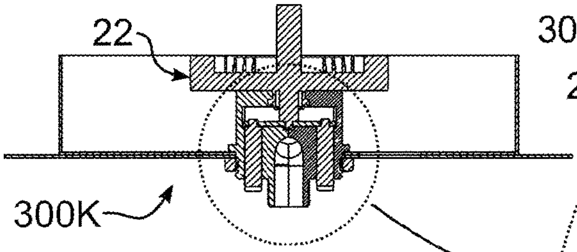
FIG. 46A
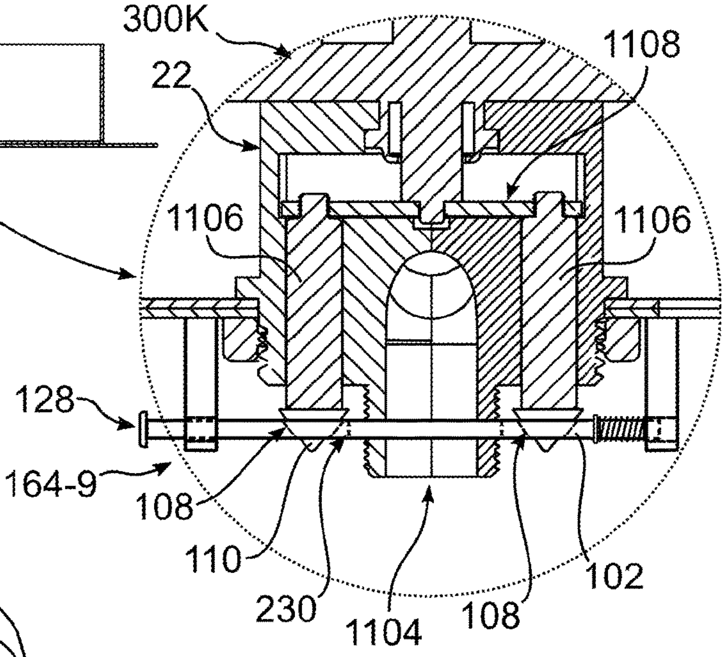
FIG. 46
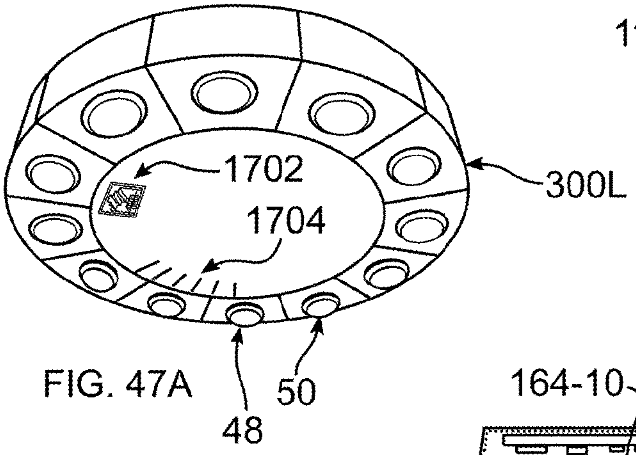
FIG. 47A
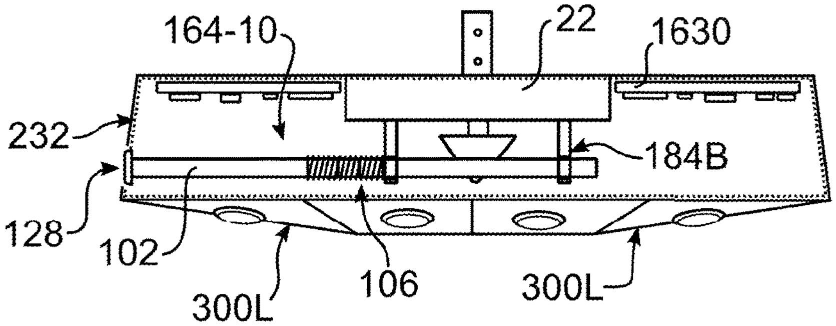
FIG. 47
FIG. 47B
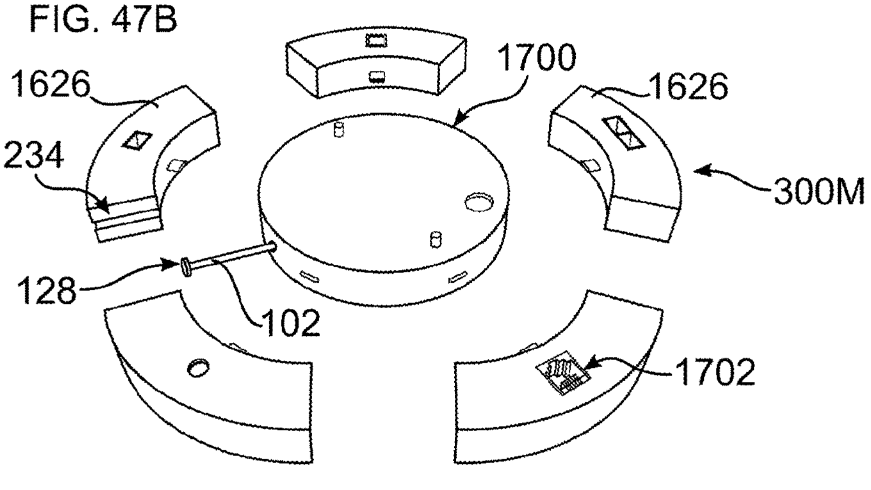

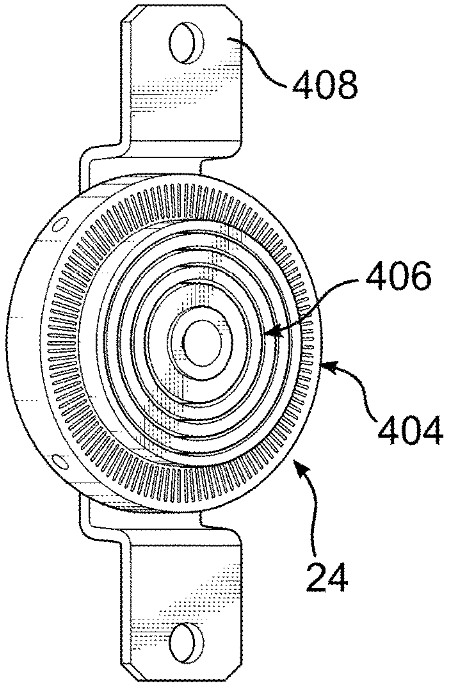
FIG. 51
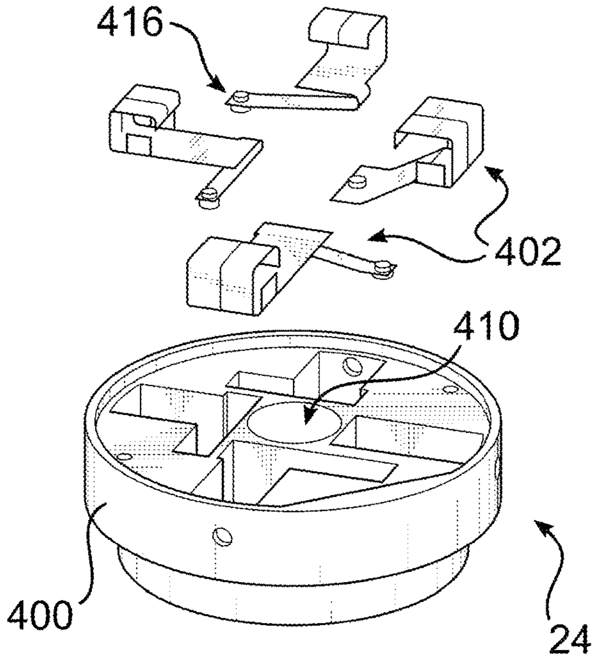
FIG. 52
FIG. 53
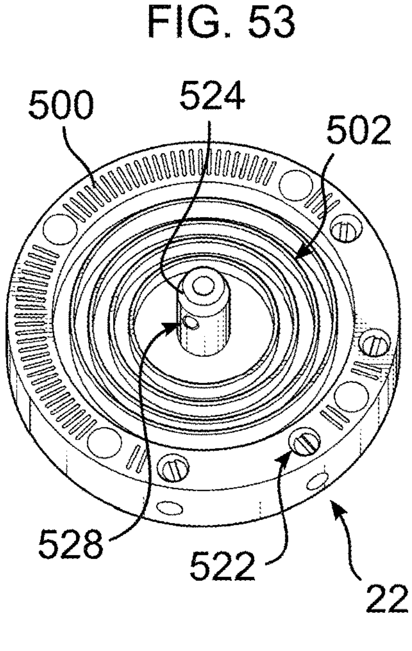
FIG. 54
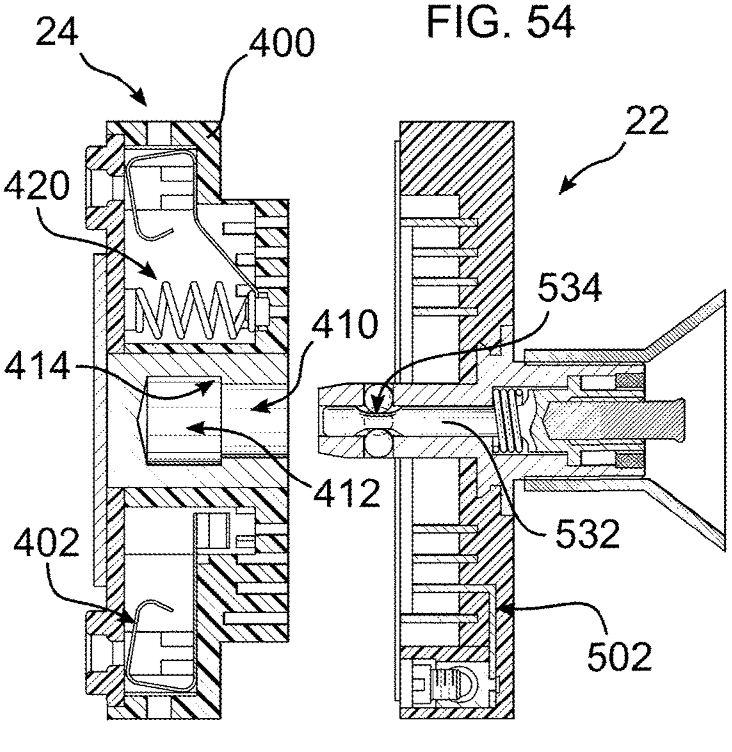

QUICK CONNECT DEVICE WITH TRANSVERSE RELEASE

LISTING OF RELATED PATENTS AND APPLICATIONS

This disclosure relates to U.S. Patent Application No. 62/486,132 filed Apr. 17, 2017; PCT International Patent Application No. PCT/US18/27956 filed Apr. 17, 2018 (published as WO 2018/195068 A1); U.S. Patent Application No. 62/467,176 filed Mar. 5, 2017; PCT International Patent Application No. PCT/US2016/032170 filed May 12, 2016 (published as WO 2016/183354 A1); U.S. Pat. No. 7,462,066 filed Mar. 20, 2007; U.S. Pat. No. 7,192,303 filed Dec. 2, 2004; and U.S. Pat. No. 6,962,498 filed Dec. 12, 2001; and to U.S. Patent Application Publication No. 2009/0280673 filed Dec. 2, 2005; U.S. Provisional Applications 62/160,585 filed May 12, 2015; 62/308,718, filed Mar. 15, 2016; 62/467,176 filed Mar. 5, 2017; 62,470,170 filed Mar. 10, 2017; 62/515,464, filed Jun. 5, 2017; and U.S. Patent Application No. 62/807,889 filed Feb. 20, 2019, the contents of all of which are hereby incorporated by reference herein, in their entirety.

FIELD OF THE DISCLOSURE

The disclosure relates to electrical connectors and fixtures, and more particularly to an electrical plug and socket combination enabling tool-less connection and mounting of electrical fixtures at electrical outlets, the connector and/or fixtures including a release and attachment latch mechanism. The disclosure relates to so-called "smart" electrical connectors and fixtures as well as electrical connectors and fixtures which are not smart.

BACKGROUND OF THE DISCLOSURE

There are a number of commercially available systems termed 'smart-home environment' systems, which can include one or more sensors and network-connected devices. These smart-home devices can sometimes intercommunicate and integrate together within the smart-home environment. The smart-home devices may also communicate with cloud-based smart-home control and/or data-processing systems in order to distribute control functionality, to access higher-capacity and more reliable computational facilities, and to integrate a particular smart home into a larger, multi-home or geographical smart-home-device-based aggregation.

Techniques for installing electrical fixtures and appliances such as lighting fixtures and fans on walls or ceilings usually require the assistance of a qualified electrician, and the use of a variety of tools and specialized hardware. The procedure for installing or uninstalling such fixtures can also be relatively time consuming, even when performed by an experienced installer, and can be hazardous. In addition to the need for hand-wiring the necessary electrical connections between the fixture and electrical power supply wiring, the installer must make separate mechanical connections for supporting or suspending the fixture in place.

SUMMARY OF THE DISCLOSURE

One aspect of the disclosure relates to a device for releasing a connection between an electric plug and a socket connectable to an electrical signal. The socket includes (a) a socket body having (b) at least one internal cavity therein, (c) at least one electrically conductive contact terminal disposed within the cavity for establishing an electrical connection between the electrical signal and the socket, and (d) a cylinder having an internal ridge. The plug comprises (a) a plug body having (b) at least one electrically conductive ring insertable into the internal cavity of the socket to form an electrical connection between the electrically conductive ring and the electrically conductive contact of the socket, (c) a spindle having a portion insertable into the socket cylinder, (d) one or more balls movable within the insertable portion of the spindle and displaceable radially to be positionable adjacent the internal ridge of the socket when the spindle portion is inserted into the socket, (e) a rod movable within the spindle portion and including one or more recesses positionable in a releasing first position adjacent to the one or more balls, and positionable in a locking second position away from the one or more balls, when the rod is slid axially within the spindle, the balls moveable away from the internal ridge of the socket when the rod is in the first position.

In an embodiment, the device comprises a cam follower connectable to an end of the rod; at least one slide support affixed with respect to the plug body; and a lever supported by and slideable within the at least one slide support. The lever includes a cam surface contactable with the cam follower when the lever is slid within the channel, whereby the lever can be slid to push the cam surface against the cam follower to move the follower and thereby move the rod to position the rod into the first position.

The rod can be urged into the second position by a rod biasing element. The lever can be urged by a lever biasing element into a position whereby the cam follower follows the cam surface to cause the rod to be moved by the rod biasing element into the second position.

The lever can be moved orthogonal to a longitudinal axis of the spindle. The lever can include an expandable ring at a free end. The lever can further include a slot through which a pin is passed to guide and limit an extent of movement of the lever.

The at least one slide support can be affixed to the plug body when the device is connected to a plug. The at least one slide support can include two slide supports affixed to the plug body on opposite sides of the spindle when the device is connected to a plug. The two slide supports can be mutually connected by a cross-member including an opening through which the spindle passes when the device is connected to a plug. The opening in the cross-member can be provided with threads.

The device can include a spring engaged with one of the at least one slide supports at a first end and engaged with the lever at a second end opposite the first end.

The device can include a canopy sized to cover the device when the device is connected to a plug, the canopy including an opening through which an end of the lever may be contacted from an exterior of the canopy.

The device can include a second cam follower, with the lever including a second cam surface separated from the first cam surface. The second cam surface is contactable with the second cam follower. When the plug has a spindle engaged by two pins positioned on opposite sides of the spindle, and when the device is connected to a plug, each of the cam follower and the second cam follower are connected to a different one of the two pins. The lever can be provided with an opening positioned between the cam surface and the second cam surface.

The device can be contained within a central hub but for a portion of the lever which extends from the central hub, further including a plurality of modules electrically connectable to the hub, each of the plurality of modules including an electronic circuit, at least one of the modules including a sensor selected from at least one of a receiver, a transmitter, a smoke detector, a motion sensor. The lever can extend between two of the plurality of modules.

The device can include a lamp head, with the lamp head connected to the plug, and the device positioned within the lamp head and proximate the plug.

Another aspect of the disclosure relates to a device for releasing a connection between an electric plug and a socket connectable to an electrical signal. The socket includes (a) a socket body having (b) at least one internal cavity therein, (c) at least one electrically conductive contact terminal disposed within the cavity for establishing an electrical connection between the electrical signal and the socket, and (d) a cylinder having an internal ridge. The plug comprises (a) a plug body having (b) at least one electrically conductive ring insertable into the internal cavity of the socket to form an electrical connection between the electrically conductive ring and the electrically conductive contact of the socket, (c) a spindle having a portion insertable into the socket cylinder, (d) one or more balls movable within the insertable portion of the spindle and displaceable radially to be positionable adjacent the internal ridge of the socket when the spindle portion is inserted into the socket, (e) a rod movable within the spindle portion and including one or more recesses positionable in a releasing first position adjacent to the one or more balls, and positionable in a locking second position away from the one or more balls, when the rod is slid axially within the spindle, the balls moveable away from the internal ridge of the socket when the rod is in the first position.

The device can comprise a conical cam follower connectable to an end of the rod; at least one slide support affixed with respect to the plug body; a lever supported by and slideable within the at least one slide support, the lever including a conical cam surface corresponding to the cam follower and contactable with the cam follower when the lever is slid within the channel, whereby the lever can be slid to push the cam surface against the cam follower to move the follower and thereby move the rod to position the rod into the first position; and a biasing element attached to the lever and one of the at least one slide supports to urge the lever into a resting position in which the lever is not pushing the cam follower. The at least one slide support can include two slide supports, each connected to the plug.

The disclosure also relates to a method of releasing a connection between an electric plug and a socket connectable to an electrical signal. The socket includes (a) a socket body having (b) at least one internal cavity therein, (c) at least one electrically conductive contact terminal disposed within the cavity for establishing an electrical connection between the electrical signal and the socket, and (d) a cylinder having an internal ridge. The plug comprises (a) a plug body having (b) at least one electrically conductive ring insertable into the internal cavity of the socket to form an electrical connection between the electrically conductive ring and the electrically conductive contact of the socket, (c) a spindle having a portion insertable into the socket cylinder, (d) one or more balls movable within the insertable portion of the spindle and displaceable radially to be positionable adjacent the internal ridge of the socket when the spindle portion is inserted into the socket, (e) a rod movable within the spindle portion and including one or more recesses positionable in a releasing first position adjacent to the one or more balls, and positionable in a locking second position away from the one or more balls, when the rod is slid axially within the spindle, the balls moveable away from the internal ridge of the socket when the rod is in the first position.

The method comprises a cam follower connectable to an end of the rod; at least one slide support affixed with respect to the plug body; and a lever supported by and slideable within the at least one slide support, the lever including a cam surface contactable with the cam follower when the lever is slid within the channel, whereby the lever can be slid to push the cam surface against the cam follower to move the follower and thereby move the rod into position the rod in the first position.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 5 depicts a bisected cross-section of the plug of FIG. 1, the release lever in a locked position;

FIG. 6 depicts a bisected cross-section of the plug of FIG. 1, the release lever in an unlocked position;

FIG. 7 depicts selected components of the device of FIG. 1;

FIG. 34 depicts a cross-section of a quick connect device modified according to the disclosure to incorporate an embodiment of a release lever assembly of the disclosure;

FIG. 34A depicts a manner of attaching the release lever assembly of FIG. 34 to the quick connect device of FIG. 34;

FIG. 35 depicts a cross-section of a quick connect device having a guard cover, modified according to the disclosure to incorporate an embodiment of a release lever assembly of the disclosure;

FIG. 36 depicts an interior view of a quick connect device having a canopy, modified according to the disclosure to incorporate an embodiment of a release lever assembly of the disclosure;

FIG. 37 depicts a perspective view of a quick connect device having a threaded guide barrel, configured with an embodiment of a release lever assembly of the disclosure;

FIG. 37A depicts a manner of attaching the release lever assembly of FIG. 37 to the quick connect device of FIG. 37;

FIG. 37B depicts a manner of configuring a return spring upon the release lever assembly of FIG. 37;

FIG. 37C depicts an alternative manner of configuring a return spring upon the release lever assembly of FIG. 37;

FIG. 38 depicts a side view of an alternative release lever assembly of the disclosure connected to threaded guide barrel;

FIG. 39 depicts a perspective view of a quick connect device having a threaded guide barrel modified according to the disclosure to incorporate an embodiment of a release lever assembly of the disclosure incorporated a structure resembling a convention threaded guide barrel connector;

FIG. 40 depicts a smart quick connect device that is configurable with a release lever assembly of the disclosure;

FIG. 44 depicts a cross-section of a quick connect device assembled into an electrical box, modified according to the disclosure to incorporate an embodiment of a release lever assembly of the disclosure;

FIG. 44A depicts a detailed view of the device and assembly of FIG. 44;

FIG. 45 depicts a cross-section of a quick connect device incorporating a dual pin release mechanism, modified according to the disclosure to incorporate a two cam embodiment of a release lever assembly of the disclosure;

FIG. 46 depicts a cross-section of an alternative quick connect device incorporating a dual pin release mechanism, modified according to the disclosure to incorporate an alternative two cam embodiment of a release lever assembly of the disclosure;

FIG. 46A depicts an entirety of the quick connect device of FIG. 46 as mounted within an enclosure;

FIG. 47 depicts an interior view of a smart quick connect device modified according to the disclosure to incorporate an embodiment of a release lever assembly of the disclosure;

FIG. 47A depicts a perspective view of an exterior of the device and assembly of FIG. 47;

FIG. 47B depicts an exploded perspective view of a device similar to the quick connect device of FIG. 47, provided with separable sensor assemblies, modified according to the disclosure to incorporate the quick release lever assembly of FIG. 47;

FIG. 51 depicts a detailed perspective view of a socket, the socket having gear teeth which are oriented along an axis that is transverse to an axis of the central bore of the socket;

FIG. 52 depicts a detailed perspective view of a plug, the plug having gear teeth mateable with the gear teeth of FIG. 13, to maintain a relative radial orientation of a mated plug and socket;

FIG. 53 depicts an exploded view of a body of a socket, including contactors and resilient contactor supports;

FIG. 54 depicts a cross-section through the middle of a socket and plug;

DETAILED DESCRIPTION OF THE DISCLOSURE

Figure 1:
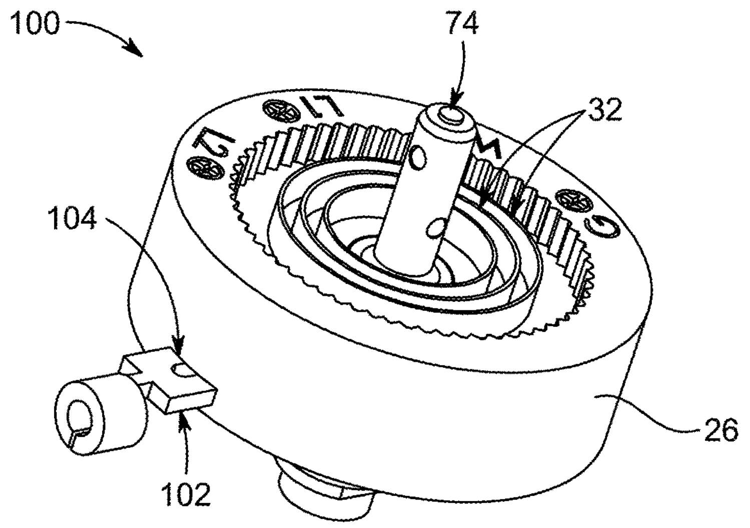
FIG. 1 depicts a top perspective view plug of the disclosure including a release lever oriented at 90 degrees with respect to a central spindle.
Figure 2:
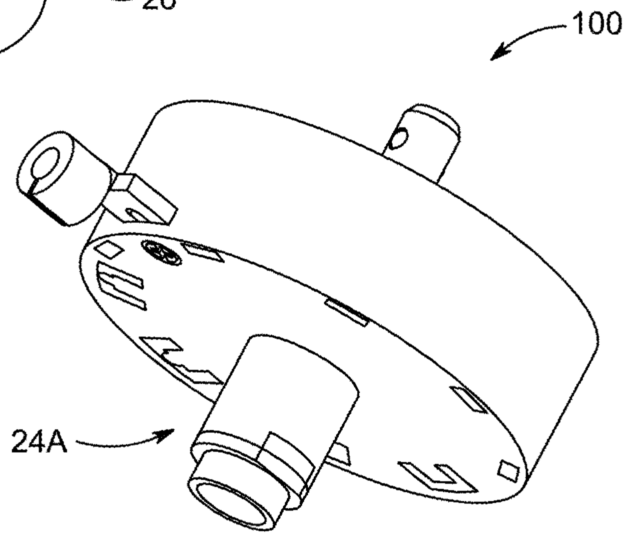
FIG. 2 depicts a bottom perspective view of the plug of FIG. 1.
Figure 3:
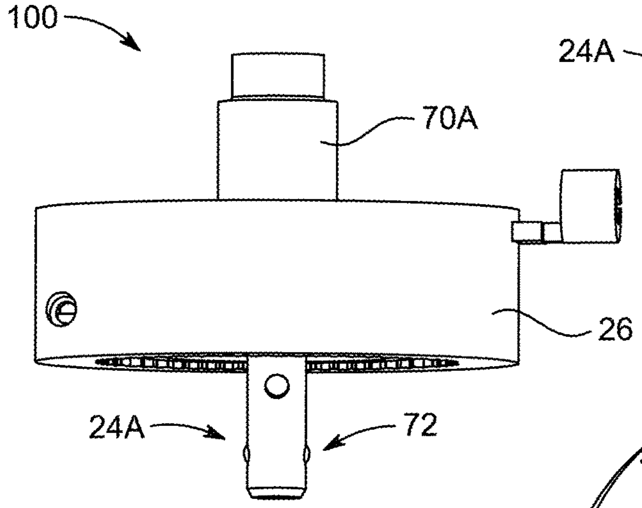
FIG. 3 depicts a side view of the plug of FIG. 1.
Figure 4:
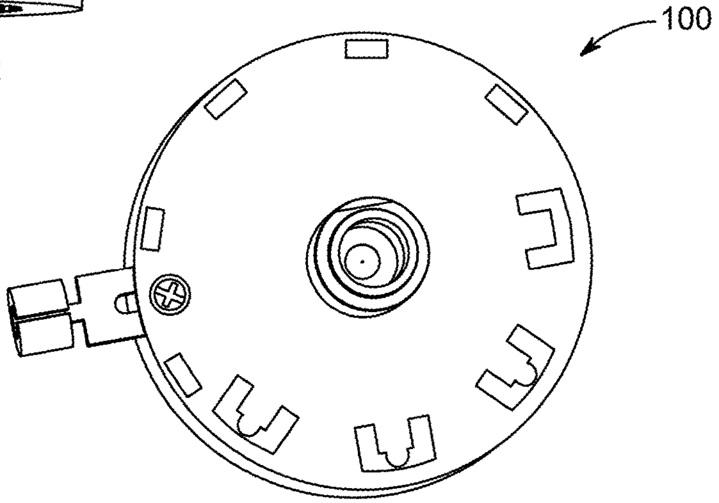
FIG. 4 depicts a bottom view of the plug of FIG. 1.

As required, embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The disclosure herein relates to the inventor's prior work, such as that set forth above in the documents identified in the Related Patents and Applications section, the contents of each of which are herein incorporated in their entirety by reference.

A "quick connect device" for installing electrical fixtures comprises the combination of a plug and mating socket. The plug and mating socket of the device function to both establish an electrical connection between an electrical fixture and electrical supply wiring, and mechanically support the fixture on a surface or base, typically a wall, ceiling or floor surface. As used herein, the term "fixture" or "electrical fixture" means any fixture or appliance such as a lighting fixture, ceiling fan, television camera, security device or any other device which is powered by electricity supplied by electrical wiring, and which requires a mechanical connection to support or suspend the fixture. The plug is fixedly secured to an electrical fixture, while the socket is secured to either the surface (e.g., wall, ceiling or floor) on which the fixture is to be mounted, or to an electrical junction box. The structure, function, and operation of the plug and mating socket, generally, have already been detailed in, for example, the patents and application incorporated by reference herein.

Referring for example to the incorporated reference published as PCT/US2016/032170 (the "'170 publication"), a quick connect device 20 for installing electrical fixtures comprises the combination of a plug 22 and mating socket 24. A detailed description of the structure and function of a plug 22 and spindle assembly 34 is provided in the '170 publication and other incorporated references. As in the '170 publication, one or more sensors or other receiving/input or transmitting/output electronic or electrical devices 48, 50 (hereinafter 'sensors') can be associated with either plug 22 or socket 24. Socket 22 is known, as disclosed in the incorporated references, and as codified in the U.S. National Electric Code.

Devices of the disclosure can be provided with or attached to electronic sensors and/or processors, transmitters and/or receivers, and other electronic circuits, and which may be deemed 'smart' devices, or device of the disclosure may be associated with power consuming devices such as lights or fans, which may or may not include 'smart' electronics or components, or other electronics which are unrelated to the operation of the device itself.

Figure 21:
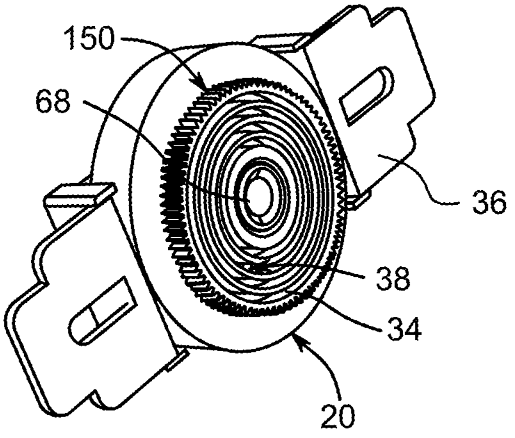
PRIOR ART FIG. 21
FIG. 21 depicts a socket of the PRIOR ART.
Figure 22:
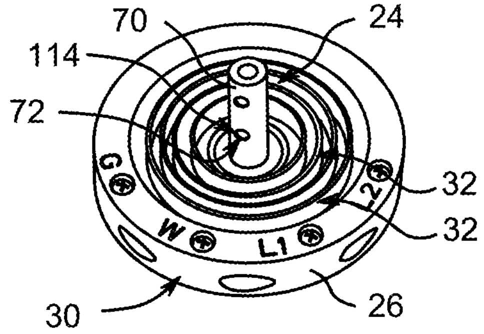
PRIOR ART FIG. 22
FIG. 22 depicts a plug of the PRIOR ART.
Figure 23:
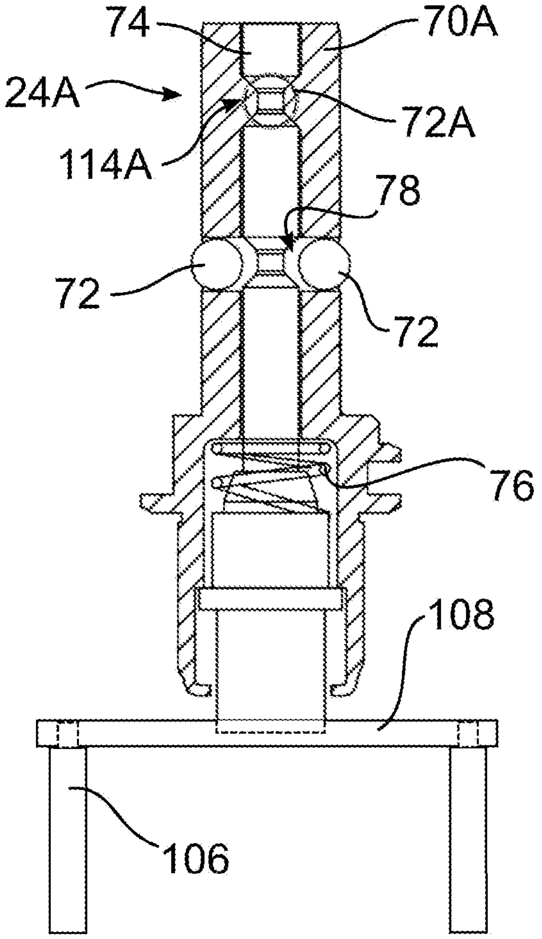
FIG. 23 PRIOR ART
FIG. 23 depicts a plug spindle including 90 degree offset balls.

An example Prior Art socket 20 is shown in FIG. 21, and a prior art plug in FIG. 22. An alternative spindle assembly 24A is shown in FIG. 23. In particular, a socket 20 of a PRIOR ART quick connect device for installing electrical fixtures receives a plug 30, thereby forming an electrical connection between socket 20 and plug 30. In FIG. 21, socket 20 can be attached to a bracket 36 or other structure which is configured for mounting to a standard electrical box or other structural member of a building. As can be seen in FIG. 22, a spindle assembly 24 is used to releasably mechanically connect plug 30 to socket 20. Male connector rings 32, which may be integrally molded into a body 26 if the latter is molded from a non-conductive material. Rings 32 have sufficient radial spacing therebetween to electrically insulate them from each other. The diameters and spacing of the male connector rings are such that they are alignable with and receivable within corresponding female recesses 34 in the socket 20, to make contact mating conductors 38 within socket 20. As detailed in the patent publications incorporated by reference, this alignment is used to electrically connect the plug 30 to the socket 20, thereby establishing an electrical connection between an electrical fixture and electrical supply wiring, and mechanically supporting the fixture on a surface or base, typically a wall, ceiling or floor surface.

The number of rings corresponds to the number of electrical connections needed. For example, an electrical power connection can include a source or Hot conductor which is circuit breaker protected, a return or Neutral conductor, and a safety or Ground conductor. Additional conductors can be added for a 3-way switch leg or traveler conductor, a second 'hot' conductor for a 2 phase connection, and any number of signal conductors for analog or digital data.

FIG. 23 shows an alternative spindle 24A, in which one or more balls 72 are radially oriented 90 degrees with respect to other balls 72 spaced axially at a distance along spindle 24A. Common to both embodiments of FIGS. 22 and 23, a spring 76 (shown in FIG. 23) biases a latch pin 74, which slides within a post 70/70A to position recesses 78 of latch pin 74 away from balls 72 to maintain balls 72 trapped within and extending from apertures 114 within post 70, thereby preventing withdrawal of post 70 from cylinder 68 of socket 20 due to interference between balls 72 and a mating groove or ledge within cylinder 68. When latch pin 74 is pushed axially against the bias of spring 76, latch pin 74 is moved to align recesses 78 with balls 72, thereby allowing balls 72 to move out of interference with cylinder 68, enabling withdrawal of post 70 from cylinder 68, and thereby removal of plug 30 from socket 20.

It should be understood that the choice of using a socket 24 for a base reflects that electrical conductors carrying dangerous electrical signals should be recessed and not touchable by people. However, where exclusively low voltage/low power signals are being used, the locations of plug and socket can be reversed or arbitrarily chosen.

Figure 8:
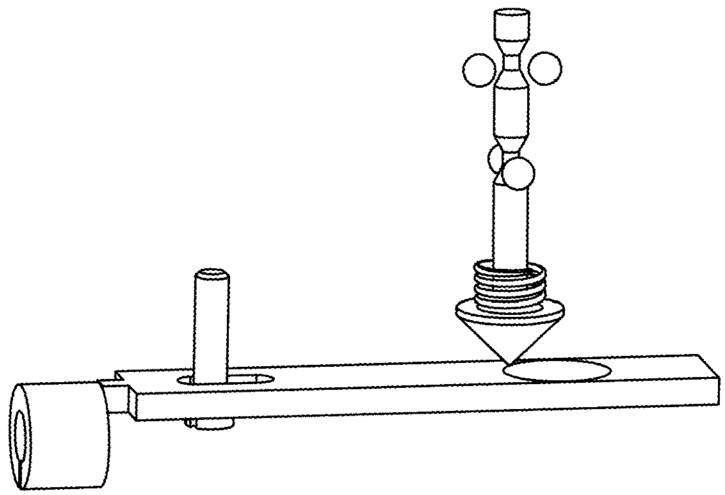
FIG. 8 depicts the release components of the device of FIG. 1.
Figure 9:
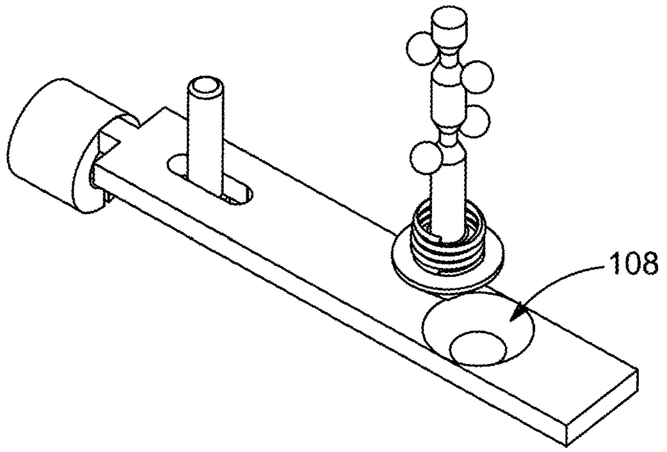
FIG. 9 depicts a top perspective view of the components of FIG. 8.
Figure 10:
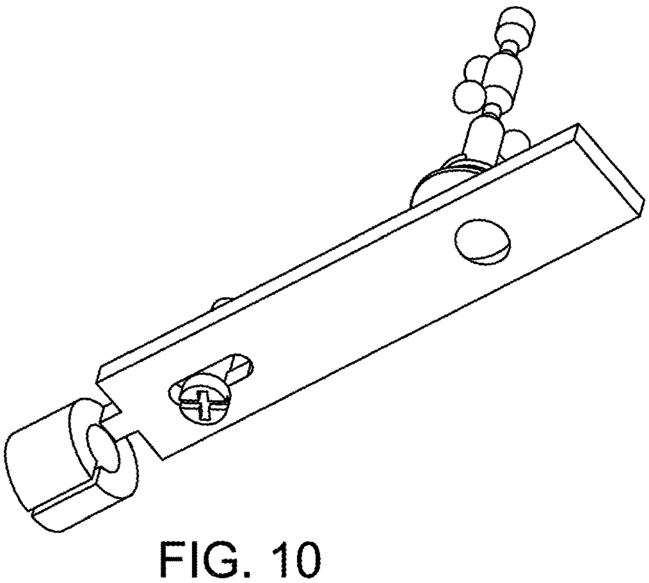
FIG. 10 depicts a bottom perspective view of the components of FIG. 8.
Figure 11:
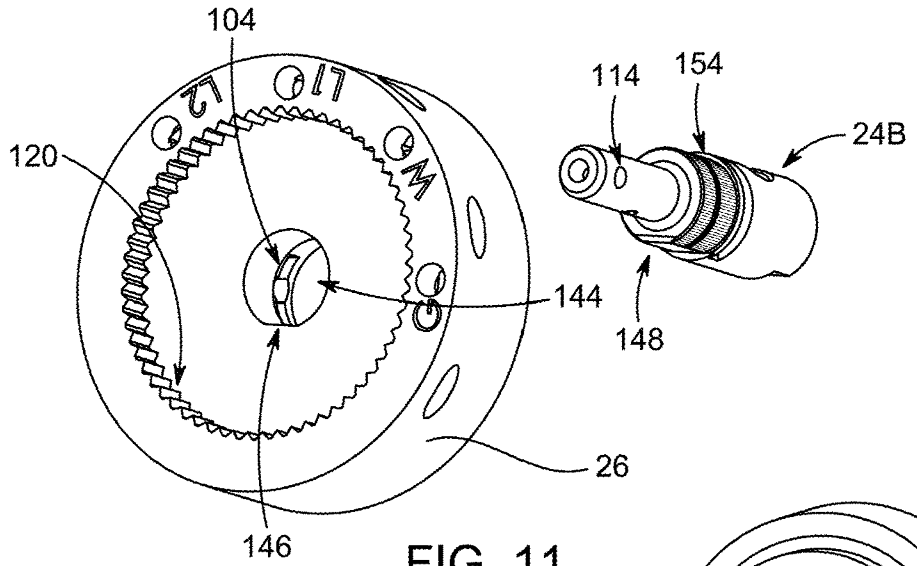
FIG. 11 depicts a top perspective view of a disassembled spindle and body of the device of FIG. 1.
Figure 12:
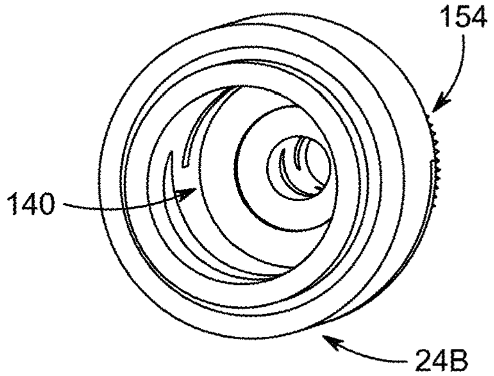
FIG. 12 depicts an enlarged bottom view of the spindle of FIG. 11.
Figure 13:
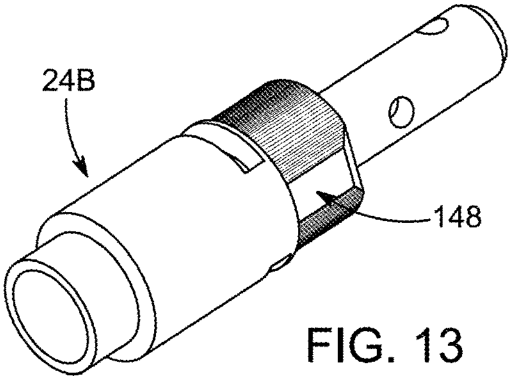
FIG. 13 depicts a bottom perspective view of the spindle of FIG. 11.

Referring now to FIGS. 1-10, a plug 100 includes a body 26 which slidingly receives a release lever 102 in a channel 104. In the embodiment shown, body 26 includes circumferential teeth 120 which mate with complementary teeth on socket 20 (not shown), to enable setting and mating a specific radial alignment of socket 20 and plug 100 when plug 100 is inserted into socket 20. As best seen in FIGS. 8-10, lever 102 includes a cam surface 108 which engages a cam follower 110 affixed to an end 112 of latch pin 74. In the embodiment shown, cam surface 108 and follower 110 are conical in profile, however cam and following surfaces do not need to be circumferential and can be positioned only along a direction of movement of lever 102 as described herein. Herein, release lever 102, channel 104, cam surface 108, cam follower 110, pin 122, and related structure, comprise a lever release assembly 164.

In FIG. 5, lever 102 is in a first position, wherein follower 110, urged by a resilient member, in this embodiment follower spring 120, has moved along cam surface 108 to increase a contact area between cam follower 110 and cam surface 108. In this position, latch pin 74 is in a lower position, as shown in FIG. 5, whereupon latch pin 74 no longer positions recesses 78 adjacent to balls 72, locking balls 72 into engagement with cylinder 68. Latch pin 74 is urged into the first position by a resilient member, in this embodiment follower spring 116, positioned between follower 110 and a ledge 118 within spindle 24B. Likewise, a resilient member, in this embodiment return spring 106, biases lever 102 in the first direction.

Figure 20:
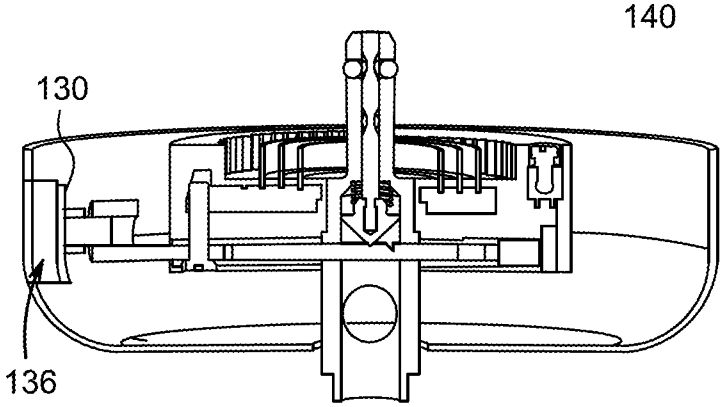
FIG. 20 depicts a bisected view of the canopy and plug of FIG. 17, the lever in the unlocked position.

Referring now to FIG. 6, lever 102 has been pushed within channel 104, against the biasing force of return spring 106, in the example of FIG. 6 to the right, into a second position representing an unlocked/release position. As lever 102 is moved towards the second position, cam follower 110 slides against the cam surface 108 which pushes cam follower 110 upwards as viewed in FIG. 6, in a direction away from lever 102, compressing follower spring 120. Accordingly, latch pin 74 moves upwards, aligning recesses 78 with balls 72, enabling balls 72 to move out of engagement with cylinder 68, whereupon plug 100 is mechanically disengageable with socket 20. In FIGS. 5-6, follower 110 has been moved completely out of engagement with cam surface 108. However, as can be seen in FIG. 20, follower 110 and recesses 78 can be positioned so that follower 110 can remain partially engaged with surface 108 to align balls 72 and recesses 78 for unlocking and releasing plug 100 and socket 20.

Cam follower 110 can be formed as a separate part attached to latch pin 74, as shown in the figures, or can be integrally formed at an end of latch pin 74. Cam follower 110 can be fabricated from any sufficiently durable and rigid material, such as metal, plastic, a synthetic or composite material, or a natural material, such as wood. When attached as a separate part, follower can be attached by an interference fit, and/or with the use of adhesive, threading, brazing, soldering, or any other method which ensures a durable attachment. As can be seen in the figures, lever 102 prevents follower 110 and thus latch pin 74 from moving out of spindle 24B, whether in the first (locked) or second (unlocked/release) position.

Lever 102 is slideably confined within channel 104, and is prevented from being pushed out of channel 104, due to the force of spring 106 or gravity, by a post or retaining screw 122 which is passed through a retention slot 124 formed within lever 102. A free end 126 of lever 102 can be provided with a lever connector 128, in the embodiment shown a split cylinder, into which an actuator can be attached, such as a push rod or push button 130 (FIGS. 17-20), for example using an interference fit. Alternatively, connector 128 can have an internal or external thread, onto which an actuator can be attached. Still further, lever 102 can be formed at end 126 into an actuator which can be manipulated to move lever 102 and release plug 100 from socket 20.

With reference to FIGS. 17-20, a canopy 200 is affixed to spindle 24B, for example using a nut 132 attached to threads 134 formed upon spindle 24B. Alternatively, canopy 200 can be attached to spindle 24B or body 26 by any suitably strong and durable means, such as adhesives, welding, brazing, soldering or other method. Canopy 200 includes an opening 136 providing access to lever free end 126. In the embodiment shown, button 130 is accessible to be pressed by a finger or tool which is disposed within opening 136. As lever 102 passes through body 26, an overall height of canopy 200 can be smaller than heretofore was possible with other release mechanisms. In particular, no additional canopy height is needed in order to accommodate a release mechanism. For example, a reduction in height of 15-20 mm has been attained.

Figure 19:
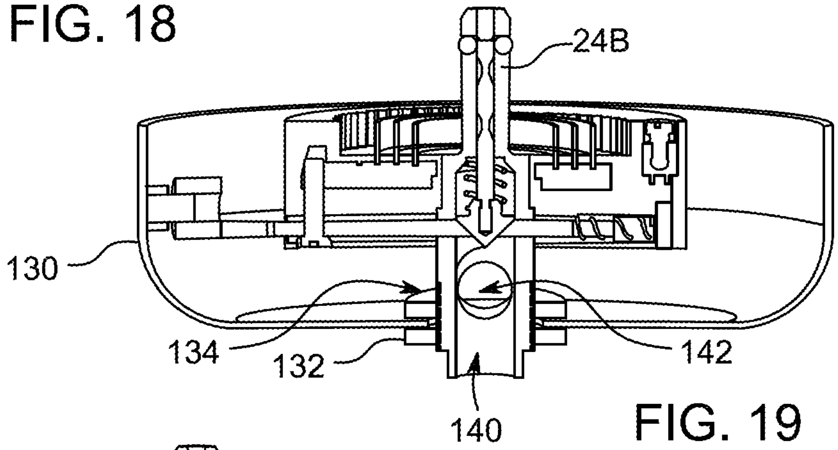
FIG. 19 depicts a bisected view of the canopy and plug of FIG. 17, the lever in the locked position.

Further, by positioning lever 102 to extend laterally from body 26 there is no obstruction to a cord or cable passing through spindle 24B, for example passing through a central spindle bore 140 and lateral passage 142 (FIG. 19). Moreover, lever 102 can be used not only with swage and corded fixtures, but with fixtures directly connected to spindle 24B, as there are no other obstructions to mechanical and electrical attachments above or below lever 102, or radially elsewhere about body 26.

Referring now to FIGS. 11-16, body 26 is attachable to spindle 24B, which can include 90 degree offset balls 72 as shown with respect to spindle 24A of FIG. 23, and as disclosed in PCT International Patent Application No. PCT/US18/27956 filed Apr. 17, 2018 (published as WO 2018/195068 A1), or can optionally be configured as shown in FIG. 22. Body 26 includes a central bore 144 through which spindle 24B can be passed during assembly of plug 100. Bore 144 can include a flattened side or keyed surface 146 which indexes with a corresponding mating spindle key 148, to establish and maintain a relative orientation between spindle 24B. In this manner, once an orientation of plug 100 and socket 20 has been established by mating teeth 120 and teeth 150 of socket 20 (FIG. 21), it is not altered by relative rotation between spindle 24B and body 26.

Figure 14:
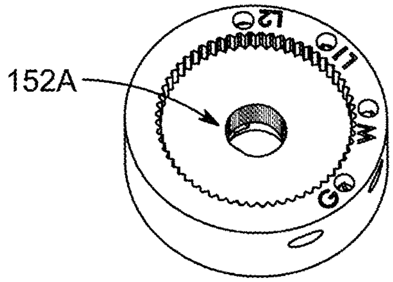
FIG. 14 depicts the body of FIG. 11, with fine central teeth.
Figure 15:
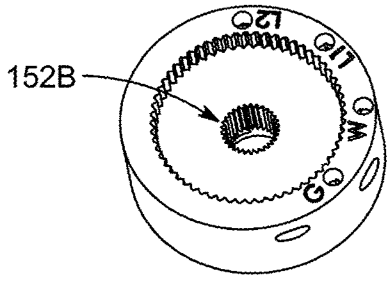
FIG. 15 depicts the body of FIG. 11, with course central teeth.
Figure 16:
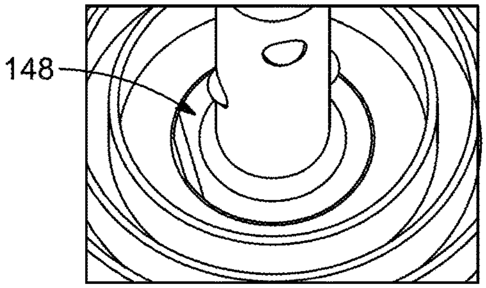
FIG. 16 depicts a top view of the spindle of FIG. 11 inserted into the hub of FIG. 11.
Figure 17:
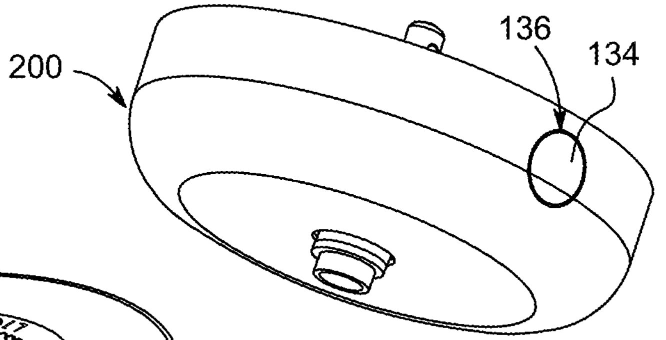
FIG. 17 depicts a bottom perspective view of a low profile canopy housing the plug of FIG. 1.
Figure 18:
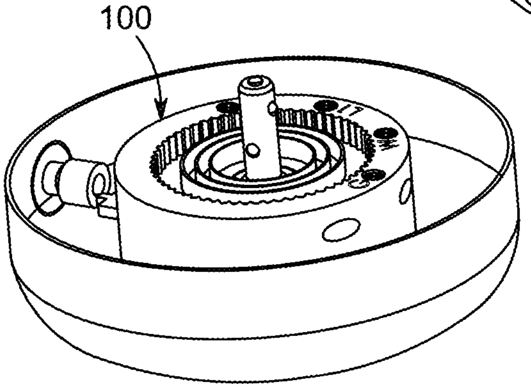
FIG. 18 depicts a top perspective view of the canopy and plug of FIG. 17.

In addition to, or as an alternative to, mating keys 146/148, central bore 144 can be provided with a spline or teeth 152A/152B (FIGS. 14-15), and/or spindle 24B can be provided with a spline or teeth 154. If both central bore 144 and spindle 24B are provided with teeth, each can mate with the other to prevent relative rotation. In an embodiment, there is an interference fit between teeth 152 and 154, further ensuring a non-slipping and durable join between body 26 and spindle 24B. FIGS. 14-15 depict fine teeth 152A and course teeth 152B, respectively. If only one of body 26 and spindle 24B is provided with teeth, an interference fit can be formed between the spline and the corresponding surface of the other of body 26/spindle 24B, driving teeth from one into the other to form a rigid and durable union.

In addition to, or as an alternative to the forgoing methods of joining base 26 and spindle 24B, other methods of attachment can be used, including adhesive, welding, brazing, soldering, crimping, co-molding, threaded fastener, or other method. By fabricating spindle 24B separately from base 26, they are more easily produced from different materials, and can each be substituted for alternative designs before, during, and after the manufacturing process.

Turning now to FIGS. 24-28, a plug 30 of the prior art or a plug 100 of the disclosure is associated with a wall switch 162, or any other device which is typically inserted into a wall switch receptacle in a similar manner for a similar purpose. A benefit of associating a prior art plug 30 or a plug 100 of the disclosure is that a wall switch can be wired and completed in order to be eligible for a certificate of occupancy, and switches or other controllers can be selected and installed later, without the need for hiring an electrician, and without leaving exposed wiring. It may be desired to select switches later because, for example, it may not be known how much current the switch may be switching, or it may not be known what color or style devices to use, as the décor may not be known or settled. Accordingly, a socket 20 is mounted within the switch receptacle box and wired into the electrical system of the building in a known manner.

Socket 20 can be attached to the electrical box using standard knock-out or screw locations. Corresponding brackets can be fastened to socket 20 in a known manner, for example as shown for bracket 36 of FIG. 21. Bracket 36 can be extended and include bends to position socket 20 more deeply within the switch box, leaving room for the switch device. Alternatively, socket 20 can be fastened directly to the bottom interior surface of the switch box using any known means, such as threaded fasteners or adhesive. For plastic switch boxes, socket 20 can be co-molded or ultrasonically welded to the switch box, for example.

Figure 24:
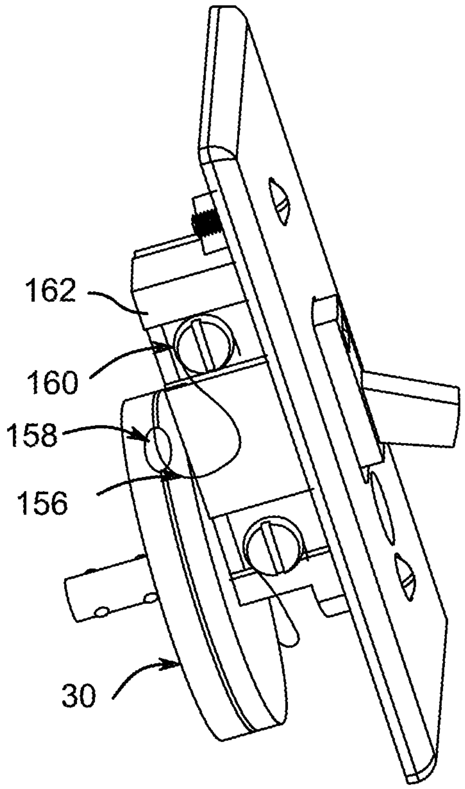
FIG. 24 depicts the plug of FIG. 22 affixed to a switch in accordance with the disclosure.
Figure 25:
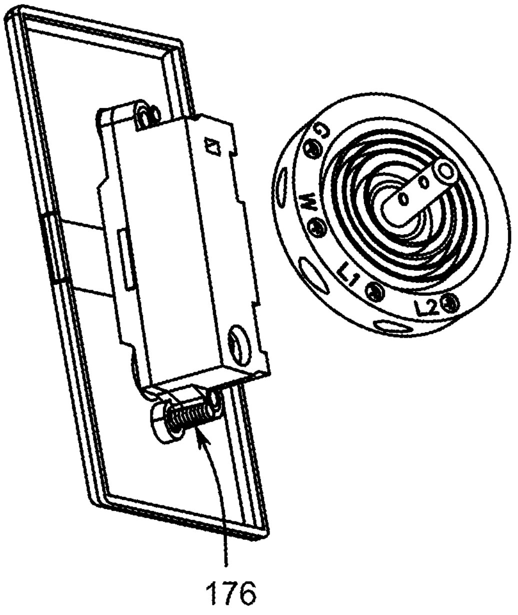
FIG. 25 depicts an exploded back view of the plug and switch of FIG. 24.
Figure 26:
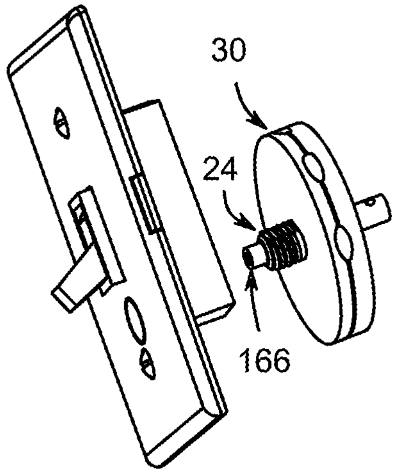
FIG. 26 depicts an exploded front view of the plug and switch of FIG. 24.
Figure 27:
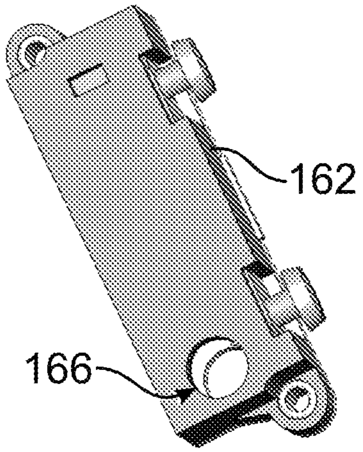
FIG. 27 depicts the switch of FIG. 24, showing an aperture for passage of the plug spindle.
Figure 28:
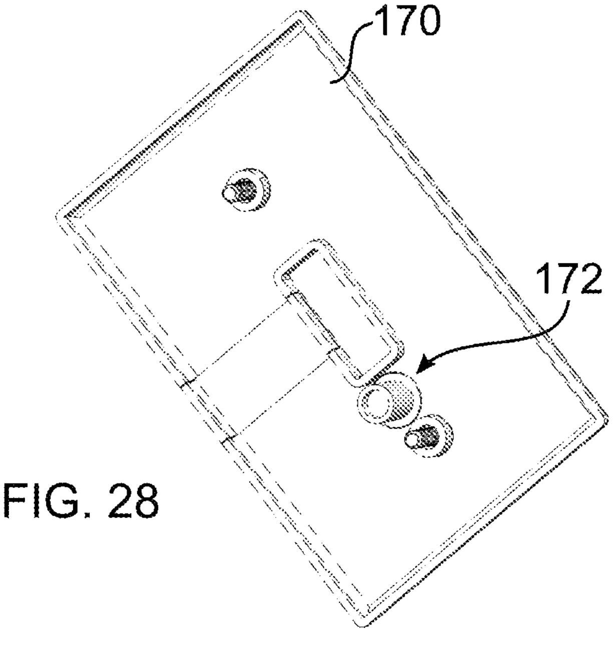
FIG. 28 depicts the switch plate of the plug and switch of FIG. 24.
Figure 29:
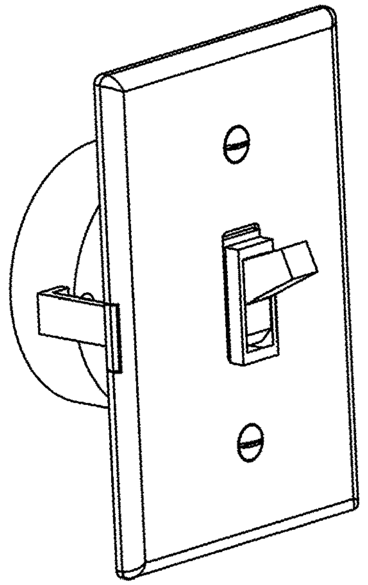
FIG. 29 depicts a front perspective view of the plug of FIG. 1 attached to a switch and switch plate, the plug including a modified lever.
Figure 30:
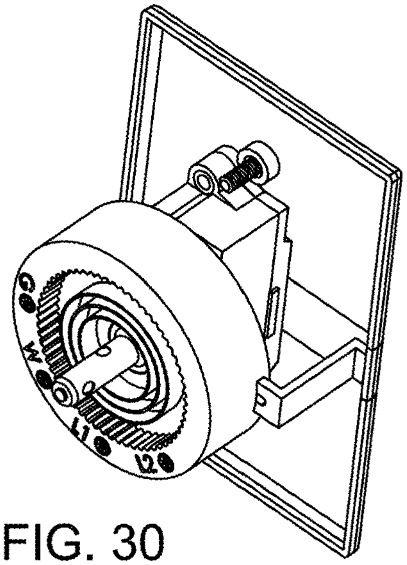
FIG. 30 depicts a back perspective view of the plug and switch of FIG. 29.
Figure 31:
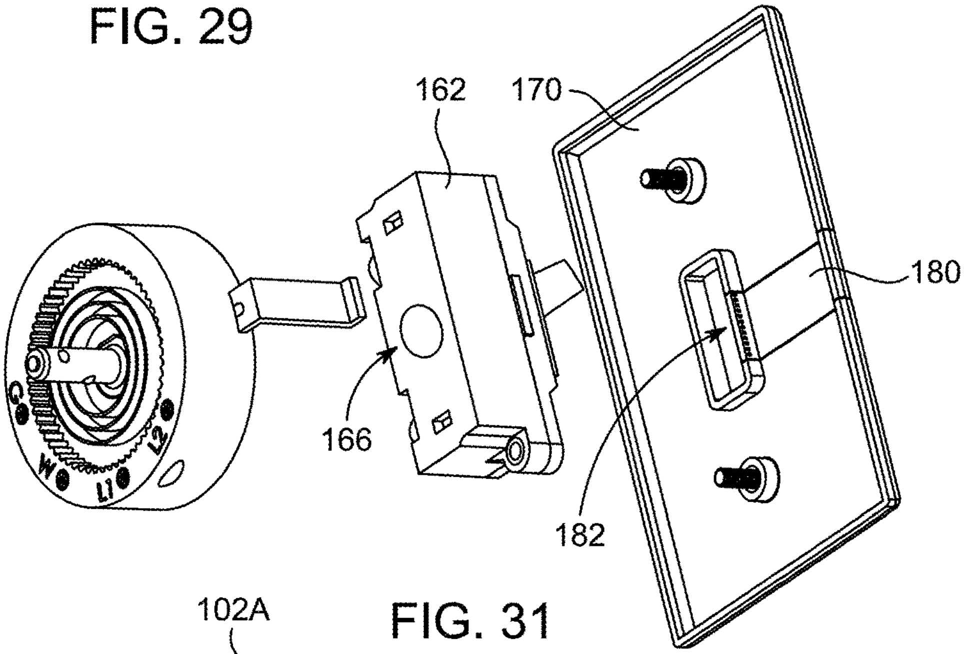
FIG. 31 depicts an exploded back view of the plug and switch of FIG. 29.

As can be seen in FIG. 24, a plug 100 of the disclosure, or as shown in FIG. 24, a standard plug 30 is attached to an electrical switch 162, for example the single gang electrical switch depicted, or any other type of electrical switch, including for example a 3-way switch, or a dimmer switch. Wires 156 connect terminals 158 of the plug to terminals 160 of the switch. In another embodiment, wires 156 are routed through spindle 24A/24B and into the back of the switch and are permanently affixed internally within the switch.

When a prior art plug 30 is used, as depicted in FIGS. 24-28, it is necessary to access a release pin or button 166 positioned upon an end of spindle 24. Depending upon a position of switch 162 with respect to plug 30/100, access to release button 166 can be blocked by switch 162. Accordingly, switch 162 can be adapted with a through-hole 168 (FIG. 27) which provides access to release button 166. Through-hole 168 can be provided with a threaded passage into which spindle 24 is threaded, to affix plug 30 to switch 162. Plug 30 can be alternatively or additionally be adhered to switch 162 along mutually contacting surfaces, or can be attached by any other means such as clips, screws or other fastener.

As can be seen in FIGS. 24-26 and 28, a switch plate 170 is provided with a release opening 172, which can have a cover 174 which can be removed to enable release button 166 to be pressed. A pin or screw 176 can be provided to facilitate pressing release button 166. In embodiments, screw 176 can be threaded into switch plate 170, switch 162, or spindle 24 and can be rotated to press release button 166.

Figure 32:
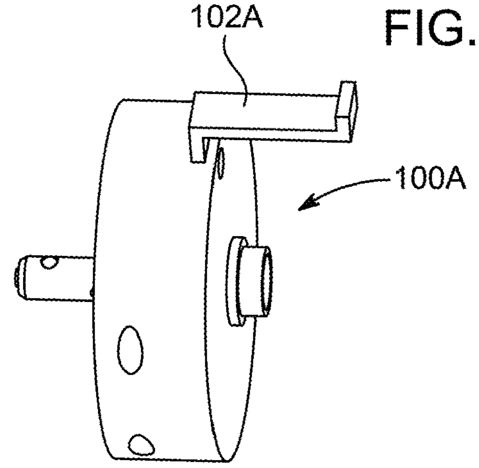
FIG. 32 depicts the plug and modified lever of the plug and switch of FIG. 29.

Referring now to FIGS. 29-33, plug 100 of the disclosure is attached to switch 162. As with the embodiment of FIGS. 24-28, plug 100 can be attached to switch 162 by being passed into an aperture 166 which can be threaded. Spindle 24B, as shown in FIG. 32, can be shortened and have an external thread, so that it does not interfere with internal components of switch 162. Alternatively, spindle 24B can be sized to not project beyond a surface of body 26 which contacts switch 162. Plug 100 can alternatively or additionally be adhered to switch 162 along mutually contacting surfaces, or can be attached by any other means such as clips, screws or other fastener.

Lever 102A is formed with a turn or angle, in the embodiment shown a right angle 178 which directs a portion of lever 102A forwards towards switch plate 170. In other respects, lever 102A is the same as lever 102 as described elsewhere herein, and the mechanism within body 26 associated with lever 102 is likewise the same as described previously with respect to lever 102. Switch plate 170 can be provided with release opening 172, or release opening 172 can be omitted, as it is not needed when plug 100 is used, as lever 102A serves to release plug 100 from socket 20. To access release lever 102A, an access door 180 is releaseably attached to switch plate 170, and can be removed or toggled open, for example by being attached with a living hinge 182 (FIG. 31) or other hinge structure, to provide access to a free end 126A, which can be manipulated laterally to slide lever 102 within channel 104 and release the combination of switch 162 and plug 100 from socket 20.

Other Embodiments

The disclosure can be carried out in combination with a variety of other "quick connect devices" (as described generally herein), examples of which follow. In each of the examples, the cited patent or publication is incorporated by reference herein. Accordingly, with respect to the reference numbers shown and described, reference may be had to the corresponding incorporated reference, and in the interest of brevity, such references will not be described again herein.

With reference to FIG. 34, a plug and socket 300A as shown and described in my U.S. Pat. No. 6,962,498 ('498 patent, FIG. 5) is provided with a release lever assembly 164-1 having at least one slide support 184, and in the embodiment shown, two slide supports 184A and 184B, which are attached to and extend from plug 1066. Slide supports 184A, 184B have a length which places channels 104, here channel 104A within support 184A, and channel 104B within support 184B, at a height which enables actuation of cam follower 110 and cam surface 108 as otherwise described herein. In particular, as lever 102 is pushed or pulled, lever 102 moves cam surface 108 against cam follower 110, pushing latch pin 74 downwards activating the release mechanism of embodiment 300A as described in the cited reference. Cam follower 110 is attached to latch pin 74 and functions as otherwise described herein.

Spring 76 of embodiment 300A biases cam follower 110 upwards into full engagement with cam surface 108, in which position socket 1064 and plug 1066 are mutually engaged in a locked position. Likewise, spring 106 urges lever 102 to return to this locked position, as described elsewhere herein. Other embodiments in the '498 patent are provided with at least one slide support 184 in a like manner. FIG. 34 illustrates a spring support arm 186 attached to and extending from slide support 184B. In this manner, no other structure from embodiment 300A is needed in order to provide a base for spring 106.

FIG. 34A is an enlarged view of the dashed circle area of FIG. 34, in perspective. FIG. 34 illustrates that post or retaining screw 122 can be inserted into slide support 184A, and retention slot 124 can be positioned to pass through channel 104A to intersect pin 122 in this location. As such, no additional structure is needed in order to support pin 122. As with other embodiments herein, pin 122 and slot 124 limit travel of lever 102, and retain lever 102 within channel 104, or if two channels are provided, channels 104A/104B.

Pin 122 and slot 124, as shown and described in FIG. 34A, and the structure including arm 186 and spring 106 of FIG. 34, are not shown in all embodiments, for clarity. These structures can be provided in any of the embodiments herein.

FIGS. 35-37 depict plugs and sockets 300B, 300C, and 300D, as shown and described in my U.S. Pat. No. 7,192,303 ('303 patent, FIGS. 4, 11, and 5, respectively), each adapted to incorporate the disclosure, and particularly slide 102, slide supports 184A, 184B, channels 104A, 104B, and associated elements as described elsewhere herein, with certain distinctions. In particular, in FIG. 35, release lever assembly 164-2 includes slide supports 184A, 184B, which are formed as short extensions attached to guard cover 1126 (126 in the '303 patent). Alternatively, channels 104A, 104B can be formed directly within guard cover 1126, in which case slide supports 184A, 184B do not need to be provided.

In FIG. 36, a quick release device 300C includes an aperture 192 formed in canopy 1148, to admit passage of lever 102 of release lever assembly 164-3 therethrough. In other respects, release lever assembly 164-3 is similar to assembly 164-1 of FIG. 34, with certain distinctions. Particularly, slide support 184B forms a spring 106 base, and return spring 106 is mounted onto lever 102 between support 184B and cam surface 108. Lever 102 can be narrowed to enable mounting of spring 106, or can be provided with a slotted portion over which spring 106 can be mounted. A profiled surface 188, shown in FIG. 36 as a taper, but which may alternatively be formed as a collar or other obstruction, limits expansion of spring 106. When lever 102 is pushed inwards to a release position, spring 106 is compressed between profile surface 190 and slide support 184B, urging lever 102 outwards and back to a locked position. The alternative location of spring 106 as shown in FIG. 36 is not shown in all embodiments, for clarity. This structure can be provided in any of the embodiments herein.

FIG. 37 depicts a quick release device 300D having a threaded rod type fixture support, and combined with lever release assembly 164-4. In this embodiment, return spring 106 is mounted upon lever 102 to abut slide support 184A and to extend in the direction of lever connector 128. In one version, shown in FIG. 37B, a retention slot 124A includes an opening 206 through which spring 106 can be passed, to be mounted upon lever 102. Spring 106 is thus bounded by slide support 184A and the extent of retention slot 124A, and is compressed in release position. Alternatively, as shown in FIG. 37C, spring 106 and lever 102 can be sized relative to each other such that spring 106 can surround lever 102. A profiled surface 188, here a collar, bounds one end of spring 106, and slide support 184A bounds the other end of spring 106, compressing spring 106 in a release position. Either of these spring 106 configurations can be used with other embodiments herein.

FIG. 37A depicts an alternative manner of attaching lever release assembly 164-4 to a threaded rod type connector. In particular, and with reference to FIG. 37A, a cross-member 202 includes a threaded aperture 204 through which threaded guide barrel 1156 can threadably pass. Slide supports 184A, 184B are attached to and extend from cross-member 202 to engage lever 102 as otherwise described herein.

In FIG. 38, a second cross-member 202A joins slide supports 184A and 184B on an opposite side of lever 102 with respect to cross-member 202, forming release lever assembly 164-5. A second threaded aperture 204A enables threadable engagement of a threaded guide barrel extension 208. An electrical fixture or device can be connected to guide barrel extension 208 as would otherwise be connected to threaded guide barrel 1156.

In a variation, as shown in FIG. 39, a standard coupler for threaded rod 210 is adapted with channels 104A, 104B within existing side structures forming slide supports 184A' and 184B', forming release lever assembly 164-6.

FIG. 40 depicts an example of a "smart quick connect device" 300E as described in my U.S. Patent Pub. 2018/0115131 (the '131 Publication, FIG. 11), which can be adapted with the device of any of FIGS. 37-39, which is threaded onto barrel 1038 as shown herein. Such smart devices include sensors, which are defined therein to include sensors 1048, 1050 (48, 50 in the cited reference) for light, audio, heat, smoke, dust, gases, or anything else which can be sensed, and also for receivers and transmitters of electronic signals.

Figure 41:
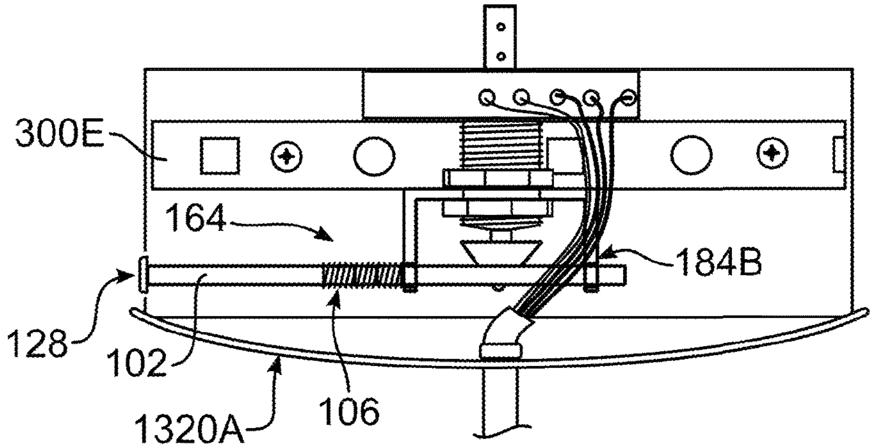
FIG. 41 depicts an interior of smart quick connect device modified according to the disclosure to incorporate an embodiment of a release lever assembly of the disclosure.

In FIG. 41, a smart device 300E as described with respect to FIG. 40 is incorporated into a canopy or housing 1320A, as described further in the '131 Publication. The canopy is shown in cross-section to illustrate smart device 300E and lever release assembly 164 within, and particularly the embodiment of FIG. 37B, in this example. FIG. 41 further illustrates that a swag or hanging lamp, in this example suspended by electrical wire 1404, can be used in combination with lever release assembly 164. This is further illustrated in FIG. 42, which incorporates another embodiment of the '131 Publication (FIG. 33 therein), and which reflects the embodiment of FIG. 39 herein.

Figure 33:
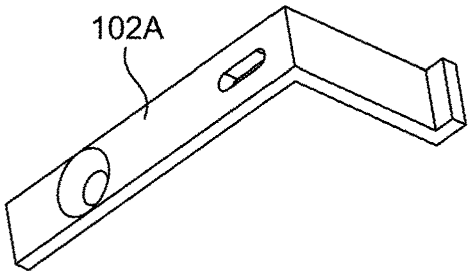
FIG. 33 depicts the modified lever of the plug of FIG. 32.
Figure 42:
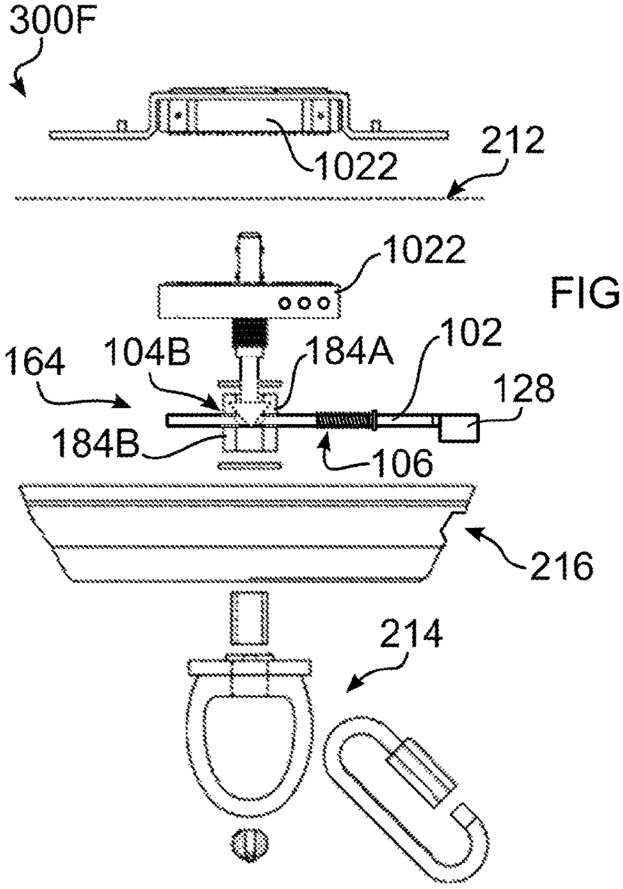
FIG. 42 depicts an exploded view of a quick connect device incorporated into a hanging fixtures, modified according to the disclosure to incorporate an embodiment of a release lever assembly of the disclosure.

FIG. 42 depicts lever release assembly 164 within a quick connect device 300F, which relates to the embodiment of FIG. 33 of the '131 Publication. Device 300F incorporates standard coupler 210, as additionally shown and described with respect to FIG. 39. FIG. 42 is an exploded view of a system installed in a ceiling 212, and which includes a quick connect socket 1022, a quick connect plug 1022, release lever 164, a canopy 1500, and standard fixture coupling hardware 214. Canopy 1500 is provided with an aperture 216 through which lever connector 128 can be accessed and pushed to release a suspended fixture from ceiling 212.

Figure 43:
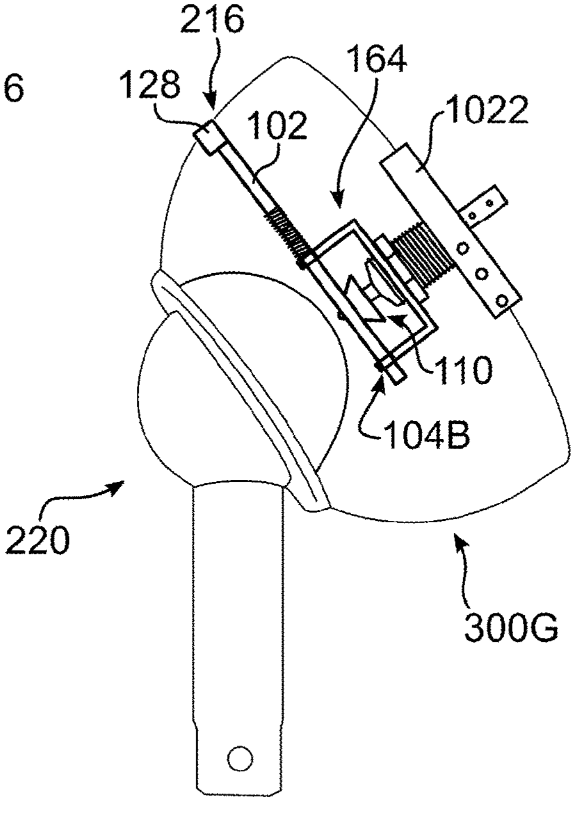
FIG. 43 depicts an interior view of a quick connect device incorporated into a suspending lighting or fan fixture, modified according to the disclosure to incorporate an embodiment of a release lever assembly of the disclosure.

FIG. 43 depicts lever release assembly 164 within a quick connect device 300G, which includes a canopy 218, ball and socket support 220, and plug 1022. Canopy 218 is shown in cross section, so that internal components can be seen. Ball and socket support 220 supports a fan, fan/light, or other electrical fixture which benefits from limited freedom of movement, as well as an ability to hang vertically. An aperture 216 is provided within canopy 218. Plug 1022 can include sensors as described herein for smart connectors, or may plug into a socket which includes such sensors, or such sensors can be mounted within canopy 218.

With reference to FIG. 44, an electrical junction box 1168 is provided with a plug 30 and socket 20, collectively indicated as 300H, and includes a cover 1152 that is attached to slide supports 184A, 184B. A ceiling is not illustrated in FIG. 44, however junction box 1168 is typically recessed above a surface of a ceiling, and cover 1152 conceals the box and a gap in the ceiling surrounding junction box 1168. A portion of FIG. 44 is shown in greater detail in FIG. 44A. Release lever 102 can be sized to fit between cover 1152 and the ceiling, or an aperture 192 (not shown) or relief notch can be provided in cover 1152 through which lever 102 may pass. Lever connector 128 can be omitted to reduce a height profile of lever 102 in this embodiment, or in any other embodiment herein. In a variation, an end of lever 102 can be provided with a small bend 222 at an end to facilitate manipulation, as shown.

In FIG. 44, one or more sensors 48, 50, as defined herein, can be provided upon cover 1152, and can be connected to an electrical system through socket 20 and plug 30, for example by wires (not shown). Alternatively, cover 1152 can be blank and devoid of sensors or other devices. In this variation, plug 30 does not need to be provided with radial connectors as usual, but can also be blank, reducing costs of the assembly of plug 30 and cover 1152. Release lever assembly 164 is used to release cover 1152 and plug 30 as otherwise described herein, regardless if there are electrical contacts within plug 30.

In FIG. 45, a quick release device 300J as detailed in WO 2018/195068 A1 ('068 Publication, FIG. 18) includes 90 degree offset locking balls 1070A, and a two-pin release mechanism 1102 which enables detachment of device 300J while leaving an unobstructed central area 1104, through which an electrical cable, support pole, or other object to pass and/or connect to device 300J. Release lever assembly 164-8 includes slide supports 184A and 184B with horizontal cross-brace portions 228A, 228B, which can be attached to post 1072A via a through-hole formed between cross-brace portions 228A, 228B, in a manner similar to FIG. 37A, although an interference fit can be provided as an alternative to a threaded connection. Alternatively, slide supports 184A and 184B can be separate, and attached to post 1072A via any other means, such as welding, brazing, threaded fasteners, adhesive, or other method. Slide supports 184A, 184B span over pins 1106 bridged by cross-brace 1108, the latter engaged with release pin 74. Each of pin 1106 is terminated by a cam follower 110, and lever 102 is provided with two corresponding cam surfaces 108. When lever 102 is pushed, both of pins 1106 are urged upwards due to interaction of cam followers 110 and cam surfaces 108, in turn pushing upon cross-brace 1108, to thereby push release pin 74 to thereby enable separation of a socket 24 (not shown in FIG. 45) connected to post 1072A and a plug 22 (not shown in FIG. 45).

In FIG. 45, pin 74 has been moved upwards by release lever assembly 164-8 to align recesses 1078 with balls 1072 to enable separation of an attached socket 20 and plug 22 (not shown in FIG. 45). As additionally illustrated, spring 106 is positioned between slide support 184A and lever connector 128, here having the form of a push button. This spring 106 location can be carried out in a like manner in other embodiments in accordance with the disclosure.

FIGS. 46 and 46A illustrate device 300K, which is detailed in the '068 Publication (FIG. 8 therein), provided with a release lever assembly 164-9, in a configuration that is similar to that of release lever 168-8 of FIG. 45. However, pins 1106 and cross-brace 1108 are positioned within plug 22, enabling slide supports 184A and 184B to connect to plug 22 without using a cross-brace portions 228A, 228B. Slide supports 184A, 184B can be connected to plug 22 by any known means, including soldering, welding, brazing, adhesive, clamp, clip, interference fit, threaded fastener, or other means. An electrical wire, or other object can be passed through an opening 230 in lever 202, and into central area 1104.

Turning now to FIGS. 47 and 47A, another smart quick connect device 300L, as detailed in WO 2018/165058 (, the '058 Publication, e.g. FIG. 12), is adapted to incorporate a release lever assembly 164-10 of the disclosure. FIG. 47A depicts device 300L without an exposed release push button (ref 36 in the cited reference). In FIG. 47, dashed region 232 depicts a cut-out view of an interior region of device 300L. As described in the cited reference, device 300L includes a quick connect plug 22, a circuit board 1630 (626, 630, 632, 654A, 710 in the reference), one or more receivers/input devices/sensors 48 and transmitters/output devices/sensors 50, and which can further include a peripheral electrical connector 1702, indicator lights 1704, or other electrical component.

Release lever assembly 164-10 is similar in certain respects to release lever assemblies 164-3 and 164-7 of FIGS. 36 and 44A, respectively, particularly in that slide supports 184A and 184B connect directly to plug 22. Spring 106 can be positioned in any of the manners shown herein. However, by positioning release lever assembly 164-10 in device 300L, the combination can be releaseably connected to any socket 24, for example a socket provided with 110 v (e.g. U.S.) or 220 v (e.g. Europe), and can thereafter provide communications, sensing, or other tasks associated with device 300L. Lever 102 can be pressed to remove and relocate the combination, as with all other embodiments herein, without the requirement of the aid of an electrical technician. This can be advantageous, for example, if the features of device 300L are only needed on occasion, or are needed in different locations at different times. A version of device 300L can be provided to provide light, particularly for applications where the combination of device 300L and release lever assembly 164-10 are replacing a light, such as a ceiling light fixture.

FIG. 47B depicts a variation of the combination of FIG. 47, which includes a device 300M as described in detail in the '058 Publication (e.g. FIG. 14 et seq.). Release lever assembly 164-10 is positioned inside device 300M, which has a central hub 1700, which is in turn connectable to any of a plurality of sensor modules 1626, shown separated from hub 1700 in FIG. 47. Release lever assembly 164-10 is otherwise connected to plug 22 in a manner as shown and described with respect to FIG. 47. For embodiments of device 300M where there is no gap between modules 1626, a channel portion 234 is formed in a module which will admit passage of lever 102. Adjacent modules 1626 may each form a mating portion of a channel. Once the modules 1626 have been assembled onto hub 1700, lever connector 128, which may have the form of a push-button, and a portion of lever 102 will project beyond modules 1626, to enable pushing thereof to enable separation of device 300M from a socket to which it is connected.

Figure 48:
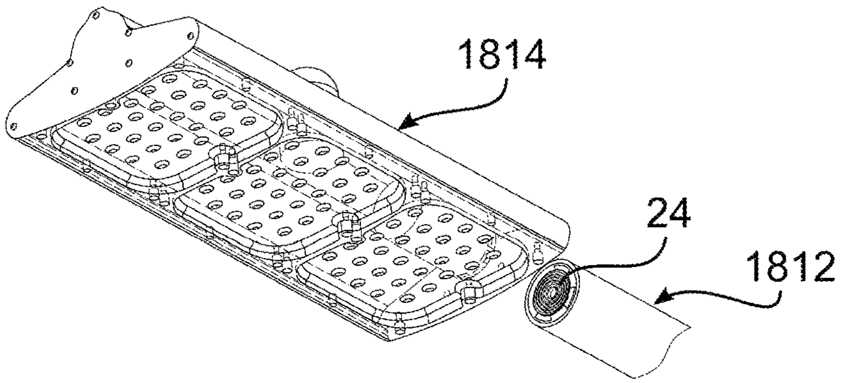
FIG. 48 depicts a perspective view of a lamp and pole assembly incorporating a quick connect device.
Figure 49:
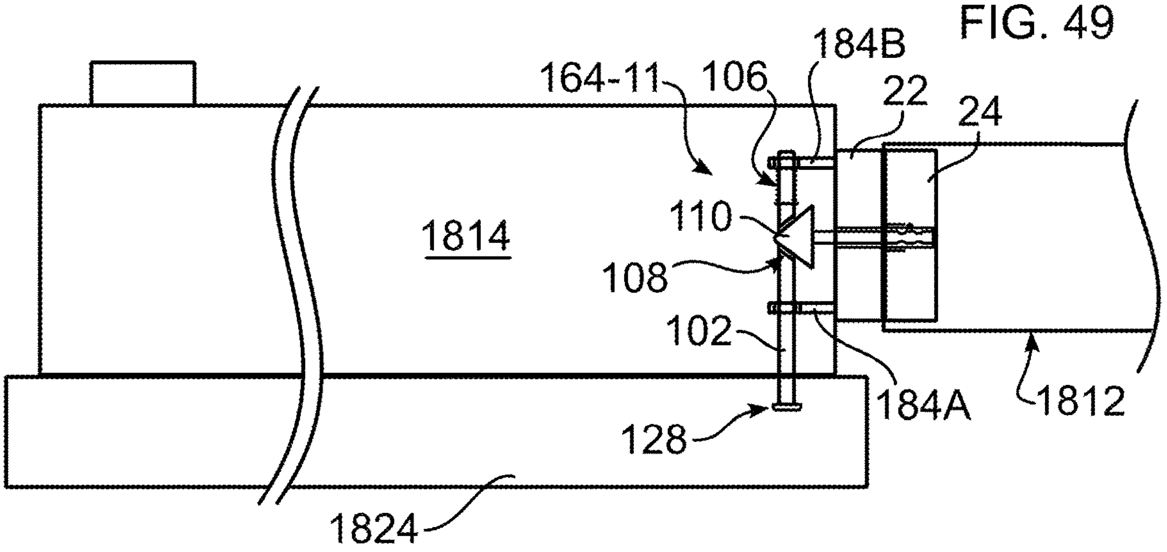
FIG. 49 depicts a cross-section of the lamp, pole, and release lever assembly of FIG. 48, in a locked position.
Figure 50:
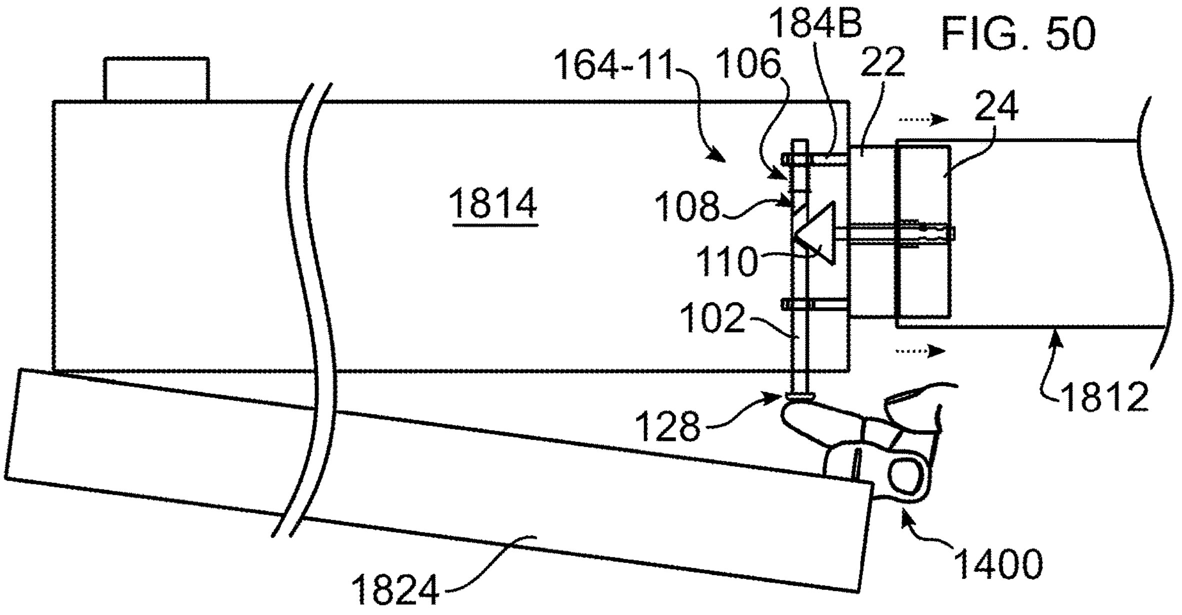
FIG. 50 depicts a cross-section of the lamp, pole, and release lever assembly of FIG. 48, in an unlocked position.

FIGS. 48-50 depict a lamp head 1814 which includes a plug 22, and a lamp head supporting pole 1812 which includes a socket 24, as described in further detail in publication WO2018204313. While lamp head 1814 is depicted as a street lamp, it should be understood that other types of lamp head types can be substituted, such as a traffic light, pedestrian walk light, industrial light, temporary light, and other types. While it is typically safer for the lamp head 1814 to include a plug 22, and the pole to include a socket 24, so that supply voltage is shielded from accidental contact, it should be understood that these locations can be swapped, ideally provided that other safeguards are in place. In the embodiment shown, plug 22 is affixed to lamp head 1814, and a release lever assembly 164-11 is mounted on an interior of lamp head 1814, adjacent to or in contact with plug 22. FIGS. 49-50 are bisecting cross-sections of lamp head 1814 and pole 1812, so that a possible location and configuration of the described components can be understood.

In FIG. 49, release lever assembly 164-11 is in a resting and locked state, as positioned by spring 106. In FIG. 50, a cover 1824 has been opened to enable access to lever connector 128, in this embodiment a button. A user's hand 1400 has pressed lever connector 128 to thereby slide lever 102 within slide supports 184A and 184B, compressing spring 106. This action causes cam surface 108 to displace cam follower 110, in turn positioning rod 1532 into a release position, enabling plug 22 and socket 24 to be separated, thereby further enabling a separation of lamp head 1814 from pole 1812.

Figure 55:
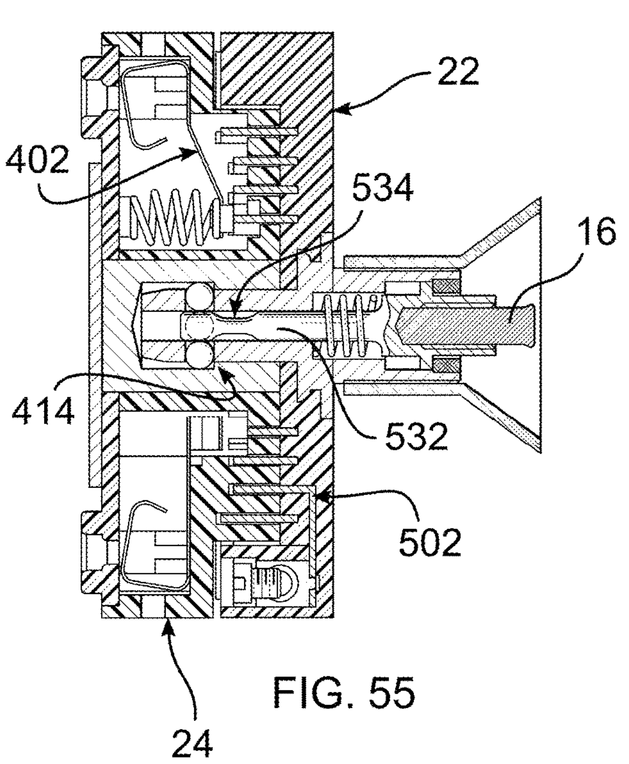
FIG. 55 depicts the socket and plug of FIG. 16, mated.

With reference to FIGS. 51, 53, and the left side portions of FIGS. 54 and 55, embodiments of a socket 24 are depicted in detail. In FIG. 53, it may be seen that socket 24 includes a non-conductive body 400 which houses a plurality of resilient contactor supports 402 including contacts 416 positioned at the end of extensions 418. A spring 420 (FIG. 54) can be positioned behind each contact 416 to bias the contact into a position within a channel 406 described further below. A cover 404 encloses supports 402 supported within body 400, and includes a series of concentric channels 406 which expose a support 402 within each channel 406. Supports 402 can be conductive, and can include a threaded aperture (not depicted) or other fastener to which an electrical wire lead can be electrically connected to the support 402, and thereby to contacts 416. A bracket 408 can be mounted to socket 24 to facilitate mounting socket 24 within or upon a pole 1812, or within or upon a lamp head 1814, in an electrical box, or to another supporting structure. Cover 404 can alternatively be integrally formed with body 400, and an opening can be provided in the body for insertion of conductors 402. In a further alternative, socket 24 is digitally printed with an enclosed body housing conductors 402 and other components described herein, and with channels 406 formed therein.

As can be seen in FIG. 54, socket body 400 includes a bore 410 which leads to a bore 412 of greater diameter, the two bores 410, 412 thereby mutually forming a ledge 414. While bore 410 and 412 form a closed-ended bore, bore 410 can lead completely through body 400, to enable passage of a release push rod 16, as discussed elsewhere herein. Ledge 414 can alternatively be formed upon a surface of body 400 that is opposite to the side having cover 404, where bore 410 extends completely through body 400.

Figure 56:
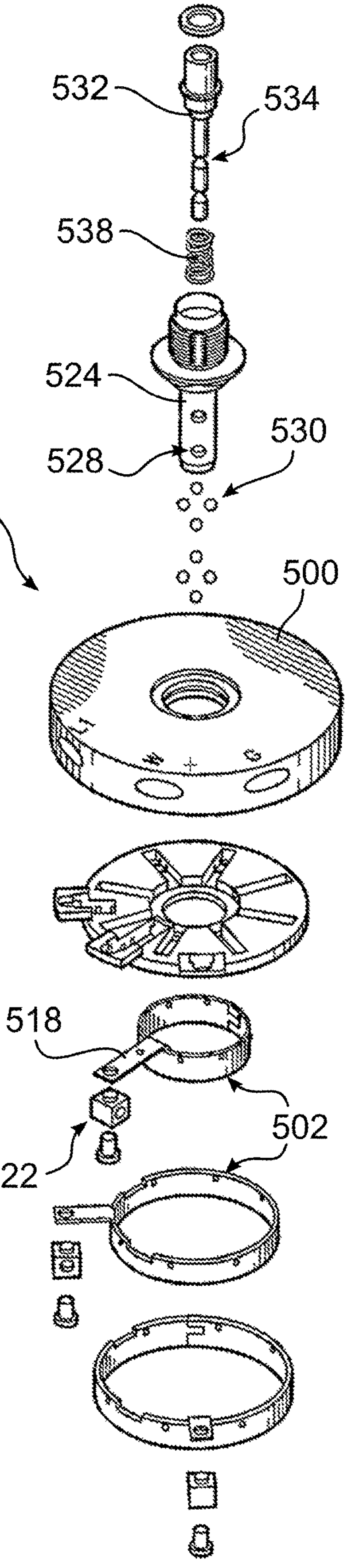
FIG. 56 depicts an exploded view of a plug.
Figure 57:
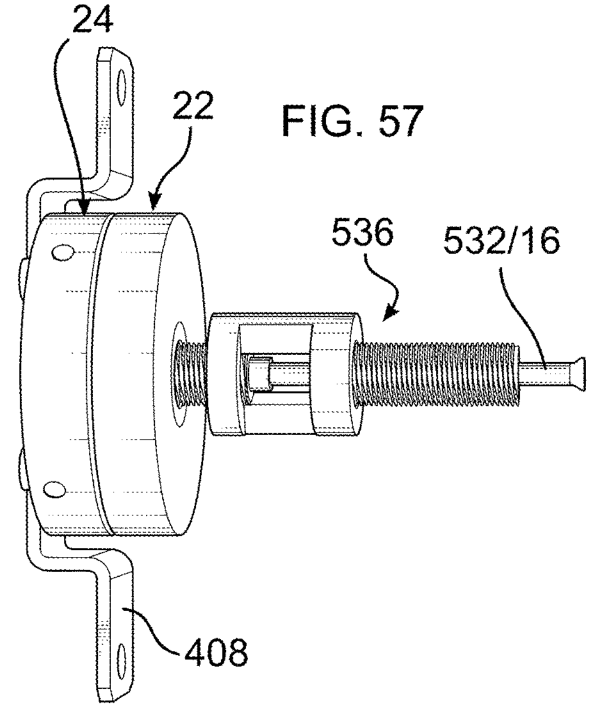
FIG. 57 depicts a detailed perspective view of a mated plug and socket, with an extended release rod and support.

With reference to FIGS. 56 and 57, and the right side portions of FIGS. 54 and 55, a plug 22 includes a base 500 with a central bore 510 which houses a series of concentric ring-shaped conductors 502 positioned coaxially to central bore 510. conductors 502 include extensions 518 terminating in terminals 522 to which an electrical wire lead can be electrically connected to each conductor 502.

A cylinder post 524 passes through central bore 510 and is affixed to base 500. Post 524 includes a central bore 526, and one or more transverse bores 528 which are disposed with a transverse axis with respect to central bore 526. Bores 528 are shaped to retain ball bearings 530 therein, while enabling them to pass at least partially outside bore 528 to project from an exterior of post 524. A retaining rod 532 is sized to slidingly pass through central bore 510, and includes one or more peripheral depressed ring channels 534 formed in a surface thereof. When rod 532 is disposed to move to a release position within bore 510, a ring channel 534 is aligned with a transverse bore 528, and a bearing 530 is permitted to enter ring channel 534, whereupon no portion of bearing 530 projects from an exterior of post 524. As rod 532 is moved to a lock position, a ring channel 534 is positioned away from alignment with a transverse bore 528, wherein bearing 530 is pushed by rod 532 so that a portion of bearing 530 must project from an exterior of post 524, and cannot fully enter transverse bore 528. A spring 538 biases rod 532 into the lock position.

As can be seen in FIGS. 55 and 57, as socket 24 and plug 22 are mated, ring-shaped conductors 502 of plug 22 are inserted into channels 406 of socket 24, to each contact and form an electrical connection with a conductor 402. Post 524 has a diameter that closely fits within bore 410, whereby it is necessary to move rod 532 to the release position, enabling all bearings 530 to move into transverse bore 528 and not extend from post 524. When socket 24 and plug 22 are fully mated and contact has been formed, rod 532 can be released to the lock position, whereupon a portion of bearings 530 may enter bore 412. In the lock position, rod 532 prevents bearings 530 from withdrawing from the partially external position, and thus bearings contact ledge 414 to prevent withdrawal of post 524, thereby locking socket 24 and post 22 together. Likewise, rod 532 can be moved to the release position again to enable separation of socket 24 and plug 22.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A device for releasing a connection between an electric plug and a socket connectable to an electrical signal, the socket including a socket body having at least one internal cavity therein, at least one electrically conductive contact terminal disposed within the cavity for establishing an electrical connection between the electrical signal and the socket, and a cylinder having an internal ridge, the plug comprising a plug body having at least one electrically conductive ring insertable into the internal cavity of the socket to form an electrical connection between the electrically conductive ring and the electrically conductive contact of the socket, a spindle having a portion insertable into the socket cylinder, one or more balls movable within the insertable portion of the spindle and displaceable radially to be positionable adjacent the internal ridge of the socket when the spindle portion is inserted into the socket, a rod movable within the spindle portion and including one or more recesses positionable in a releasing first position adjacent to the one or more balls, and positionable in a locking second position away from the one or more balls, when the rod is slid axially within the spindle, the balls moveable away from the internal ridge of the socket when the rod is in the first position, the device comprising:

a cam follower connectable to an end of the rod;

at least one slide support affixed with respect to the plug body;

a lever supported by and slideable within the at least one slide support, the lever including a cam surface contactable with the cam follower when the lever is slid within the at least one slide support, whereby the lever can be slid to push the cam surface against the cam follower to move the follower and thereby move the rod to position the rod into the first position, wherein the rod is urged into the second position by a rod biasing element, and wherein the lever is urged by a lever biasing element into a position whereby the cam follower follows the cam surface to cause the rod to be moved by the rod biasing element into the second position.

2. The device of claim 1, wherein the lever moves orthogonal to a longitudinal axis of the spindle.

3. The device of claim 1, wherein the lever includes an expandable ring at a free end.

4. The device of claim 1, wherein the lever further includes a slot through which a pin is passed to guide and limit an extent of movement of the lever.

5. The device of claim 1, wherein the at least one slide support is affixed to the plug body when the device is connected to a plug.

6. The device of claim 1, further including a spring engaged with one of the at least one slide supports at a first end and engaged with the lever at a second end opposite the first end.

7. The device of claim 1, further including a canopy sized to cover the device when the device is connected to a plug, the canopy including an opening through which an end of the lever may be contacted from an exterior of the canopy.

8. The device of claim 1, further including a second cam follower, the lever including a second cam surface separated from the first cam surface, the second cam surface contactable with the second cam follower, wherein when the plug has a spindle engaged by two pins positioned on opposite sides of the spindle, and when the device is connected to a plug, each of the cam follower and the second cam follower are connected to a different one of the two pins.

9. The device of claim 8, wherein the lever is provided with an opening positioned between the cam surface and the second cam surface.

10. The device of claim 1, further including a lamp head, the lamp head connected to the plug, the device positioned within the lamp head and proximate the plug.

11. The device of claim 1, wherein the at least one slide support includes two slide supports affixed to the plug body on opposite sides of the spindle when the device is connected to a plug.

12. The device of claim 11, wherein the two slide supports are mutually connected by a cross-member including an opening through which the spindle passes when the device is connected to a plug.

13. The device of claim 12, wherein the opening in the cross-member is provided with threads.

14. A device for releasing a connection between an electric plug and a socket connectable to an electrical signal, the socket including a socket body having at least one internal cavity therein, at least one electrically conductive contact terminal disposed within the cavity for establishing an electrical connection between the electrical signal and the socket, and a cylinder having an internal ridge, the plug comprising a plug body having at least one electrically conductive ring insertable into the internal cavity of the socket to form an electrical connection between the electrically conductive ring and the electrically conductive contact of the socket, a spindle having a portion insertable into the socket cylinder, one or more balls movable within the insertable portion of the spindle and displaceable radially to be positionable adjacent the internal ridge of the socket when the spindle portion is inserted into the socket, a rod movable within the spindle portion and including one or more recesses positionable in a releasing first position adjacent to the one or more balls, and positionable in a locking second position away from the one or more balls, when the rod is slid axially within the spindle, the balls moveable away from the internal ridge of the socket when the rod is in the first position, the device comprising:

a cam follower connectable to an end of the rod;

at least one slide support affixed with respect to the plug body;

a lever supported by and slideable within the at least one slide support, the lever including a cam surface contactable with the cam follower when the lever is slid within the at least one slide support, whereby the lever can be slid to push the cam surface against the cam follower to move the follower and thereby move the rod to position the rod into the first position, wherein the device is contained within a central hub but for a portion of the lever which extends from the central hub, further including a plurality of modules electrically connectable to the hub, each of the plurality of modules including an electronic circuit, at least one of the modules including a sensor selected from at least one of a receiver, a transmitter, a smoke detector, a motion sensor.

15. The device of claim 14, wherein the lever extends between two of the plurality of modules.

16. A device for releasing a connection between an electric plug and a socket connectable to an electrical signal, the socket including a socket body having at least one internal cavity therein, at least one electrically conductive contact terminal disposed within the cavity for establishing an electrical connection between the electrical signal and the socket, and a cylinder having an internal ridge, the plug comprising a plug body having at least one electrically conductive ring insertable into the internal cavity of the socket to form an electrical connection between the electrically conductive ring and the electrically conductive contact of the socket, a spindle having a portion insertable into the socket cylinder, one or more balls movable within the insertable portion of the spindle and displaceable radially to be positionable adjacent the internal ridge of the socket when the spindle portion is inserted into the socket, a rod movable within the spindle portion and including one or more recesses positionable in a releasing first position adjacent to the one or more balls, and positionable in a locking second position away from the one or more balls, when the rod is slid axially within the spindle, the balls moveable away from the internal ridge of the socket when the rod is in the first position, the device comprising:

a conical cam follower connectable to an end of the rod;

at least one slide support affixed with respect to the plug body;

a lever supported by and slideable within the at least one slide support, the lever including a conical cam surface corresponding to the cam follower and contactable with the cam follower when the lever is slid within the at least one slide support, whereby the lever can be slid to push the cam surface against the cam follower to move the follower and thereby move the rod to position the rod into the first position; and a biasing element attached to the lever and one of the at least one slide supports to urge the lever into a resting position in which the lever is not pushing the cam follower.

17. The device of claim 16, wherein the at least one slide support includes two slide supports, each connected to the plug.

* * * * *